(12) United States Patent
Kobayashi

(10) Patent No.: US 6,323,900 B1
(45) Date of Patent: *Nov. 27, 2001

(54) DIGITAL CAMERA WITH ANALOG AND DIGITAL CLAMP CIRCUIT

(75) Inventor: Akio Kobayashi, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/661,678

(22) Filed: Sep. 14, 2000

Related U.S. Application Data

(63) Continuation of application No. 08/813,867, filed on Mar. 7, 1997, now Pat. No. 6,157,407.

(30) Foreign Application Priority Data

Mar. 12, 1996 (JP) .......................................... 8-54432

(51) Int. Cl.[7] .................................................. H04N 5/217
(52) U.S. Cl. ........................................... 348/241; 348/243
(58) Field of Search ..................................... 348/241, 242, 348/243, 244, 245, 246, 247, 251, 257, 222, 367, 678, 689, 695, 696, 691; 358/443, 445, 471, 474, 479, 482, 483

(56) References Cited

U.S. PATENT DOCUMENTS

| 4,652,927 | * | 3/1987 | Hashimoto | 348/255 |
| 4,740,828 | * | 4/1988 | Kinoshita | 348/222 |
| 4,910,599 | * | 3/1990 | Hashimoto | 348/240 |
| 5,448,306 | * | 9/1995 | Koyama | 348/678 |
| 5,612,739 | * | 3/1997 | Maki et al. | 348/243 |
| 5,642,162 | * | 6/1997 | Maki et al. | 348/241 |
| 5,717,457 | * | 2/1998 | Morimoto | 348/241 |
| 5,717,459 | * | 2/1998 | Maki et al. | 348/312 |
| 6,157,407 | * | 12/2000 | Kobayashi | 348/241 |

FOREIGN PATENT DOCUMENTS

| 62-67969 | 3/1987 | (JP) . |
| 4-207475 | 7/1992 | (JP) . |
| 4-192677 | 10/1992 | (JP) . |

\* cited by examiner

Primary Examiner—Wendy R. Garber
Assistant Examiner—Aung S. Moe
(74) Attorney, Agent, or Firm—Michaelson & Wallace; Peter L. Michaelson

(57) ABSTRACT

A digital camera includes a CCD imager, and a CCD output signal from the CCD imager is clamped in an analog clamp area by an analog clamp circuit, and then, converted into a digital signal by an A/D converter. The digital signal is thereafter applied to a clamp level calculation circuit which calculates a clamp level of the digital signal, whereby the digital signal can be subjected to digital clamping by a first subtraction circuit.

5 Claims, 22 Drawing Sheets

F I G. 2
F I G. 3
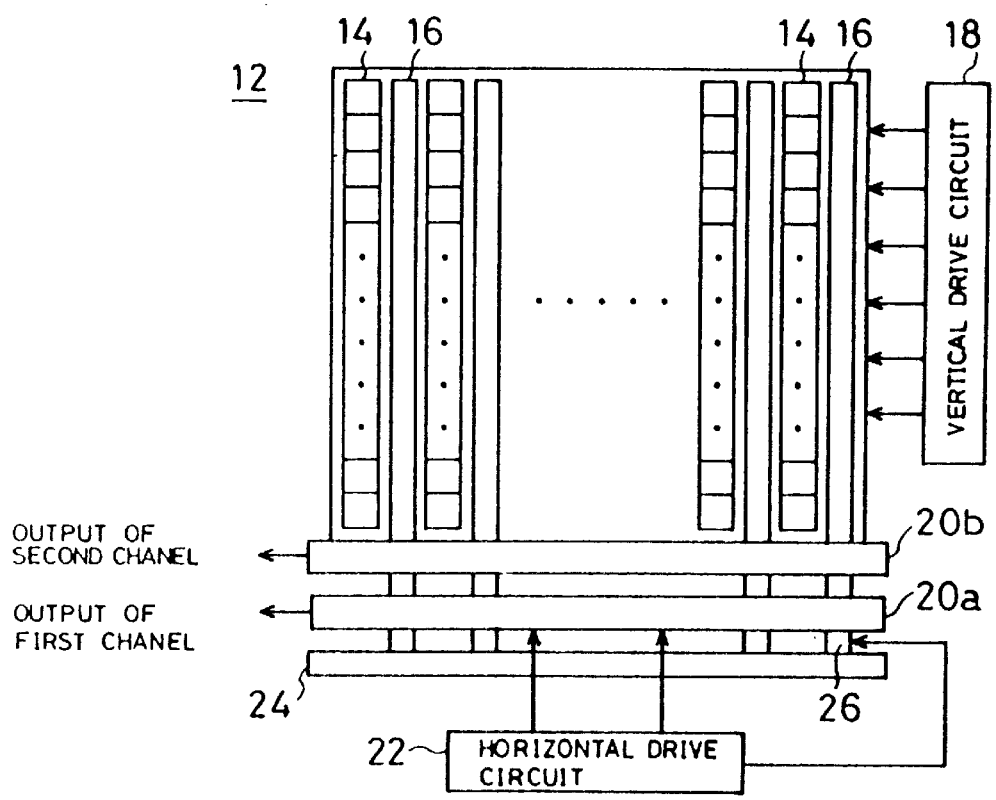

F I G. 7
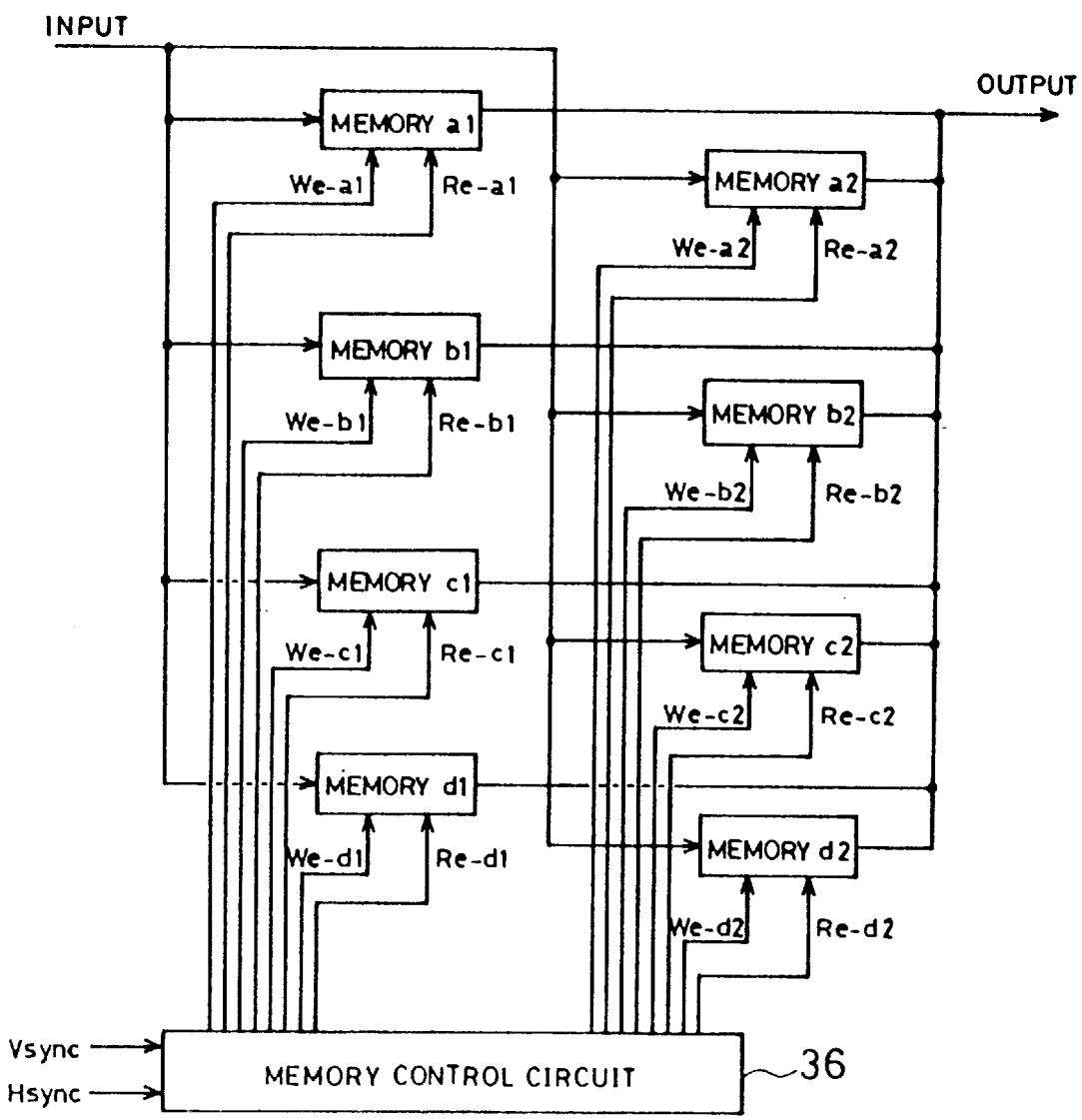

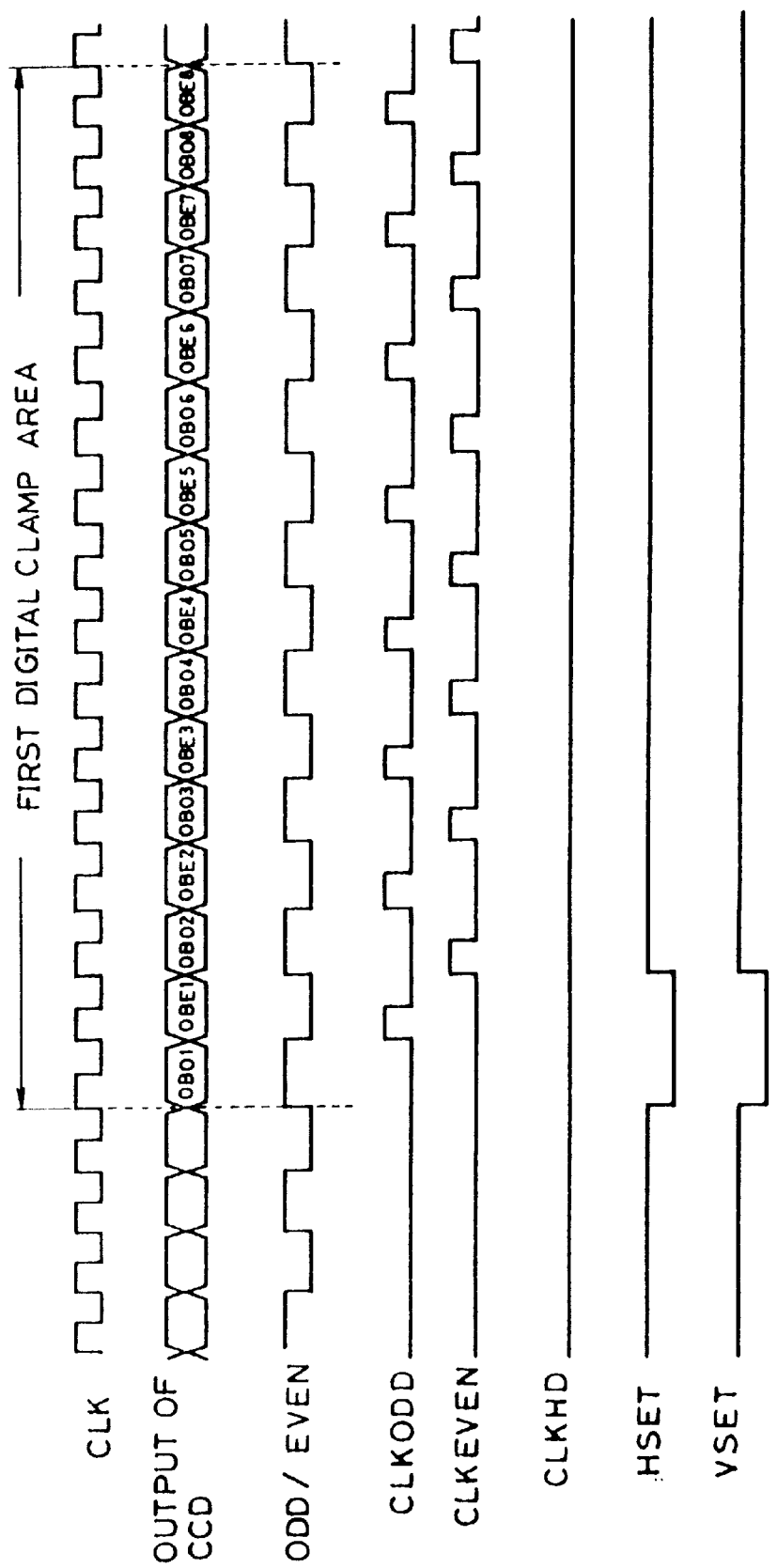
F I G. 17

F I G. 20
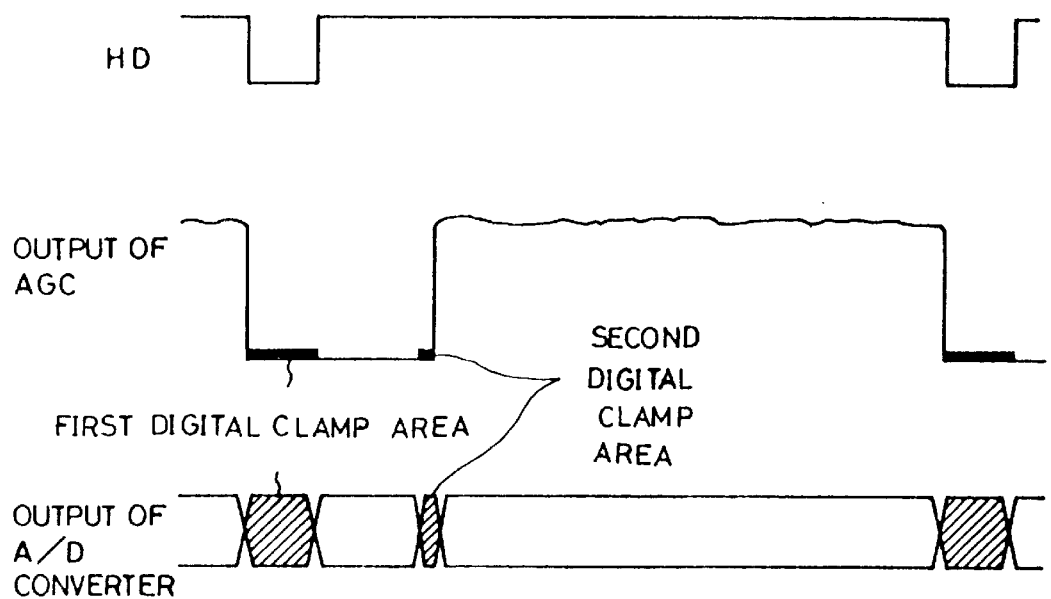

(a) ARRANGEMENT OF COMPLEMENTARY COLOR FILTER (b) CAMERA SIGNAL OF ODD FIELD (c) CAMERA SIGNAL OF EVEN FIELD

US 6,323,900 B1

DIGITAL CAMERA WITH ANALOG AND DIGITAL CLAMP CIRCUIT

This application is continuation of co-pending U.S. patent application Ser. No. 08/813,867 filed Mar. 7, 1997; U.S. Pat. No. 6,157,407, and entitled "Digital Camera With Analog and Digital Clamp Circuit (as amended)".

BACKGROUND OF THE INVENTION

1. Field of the Invention

The present invention relates to digital cameras, and more particularly to a digital camera adapted to process analogically and digitally an image signal from a CCD using a mosaic-type color filter or a stripe-type color filter, for example, so as to clamp a black level.

2. Description of the Prior Art

There is disclosed one example of a conventional digital video camera of this kind by Japanese Provisional Patent Publication (Kokai) H4-192677 [H04N 5/15, 5/92] laid open to public inspection dated Jul. 10, 1992. This prior art discloses that an analog video signal is analog-clamped and thereafter A/D-converted into a digital signal for being subjected to digital clamping, thereby providing effective utilization of a dynamic range during A/D conversion and keeping constant a quantization level as a tip level of a synchronization signal.

With such conventional techniques, however, there is a fear that noises superposed onto the analog video signal due to analog clamping might have an effect upon digital clamping. Nevertheless, the same publication does not disclose a solving method therefor at all.

SUMMARY OF THE INVENTION

Therefore, a principle object of the invention is to provide a digital camera capable of clamping a digital signal in an appropriate manner.

According to the invention, a digital camera comprises a CCD imager for outputting line signals, each of the line signals being clamped in an analog clamp area of the CCD imager by an analog clamp means and then converted into a digital signal, the digital signal being digital-clamped in a digital clamp area by a digital clamp means, the digital video camera characterized in that: the analog clamp area is set such that both horizontal ends of the analog clamp area are positioned at the outside of the digital clamp area.

The analog clamp means clamps each line signal outputted from the CCD imager in the analog clamp area, while the digital clamp means clamps the digital signal in the digital clamp area. Here, the analog clamp area is set such that the both horizontal ends thereof are positioned at the outside of the digital clamp area. That is, the analog clamp area is set such that it covers the digital clamp area at least with respect to a horizontal direction, or set at a different area from the digital clamp area. By doing so, even if there occurs noise at the both horizontal ends when each line signal is clamped by the analog clamp means, there is no possibility that the noise influences on the processing by the digital clamp means.

According to the present invention, the both horizontal ends of the analog clamp area are arranged so as to be positioned at the outside of the digital clamp area, so that it is possible to appropriately clamp the CCD output.

The above described object, other objects, features and advantages of this invention will be more apparent from the following description on examples with reference to the accompanying drawings.

BRIEF DESCRIPTION OF THE DRAWINGS

FIG. 2 is an explanatory diagram showing an arrangement of a mosaic-type color filter employed in the embodiment of FIG. 1;

FIG. 3 is an explanatory diagram showing a solid-state imaging device unit in FIG. 1;

FIG. 7 is a block diagram showing a rearrangement circuit for the embodiment of FIG. 1;

FIG. 17 is a timing chart showing the operation of the clamp-level calculating circuit of FIG. 16 in a first predetermined period;

FIG. 20 is a timing chart showing a first digital clamp area and a second digital clamp area;

DETAILED DESCRIPTION OF THE PREFERRED EMBODIMENTS

Figure 1:
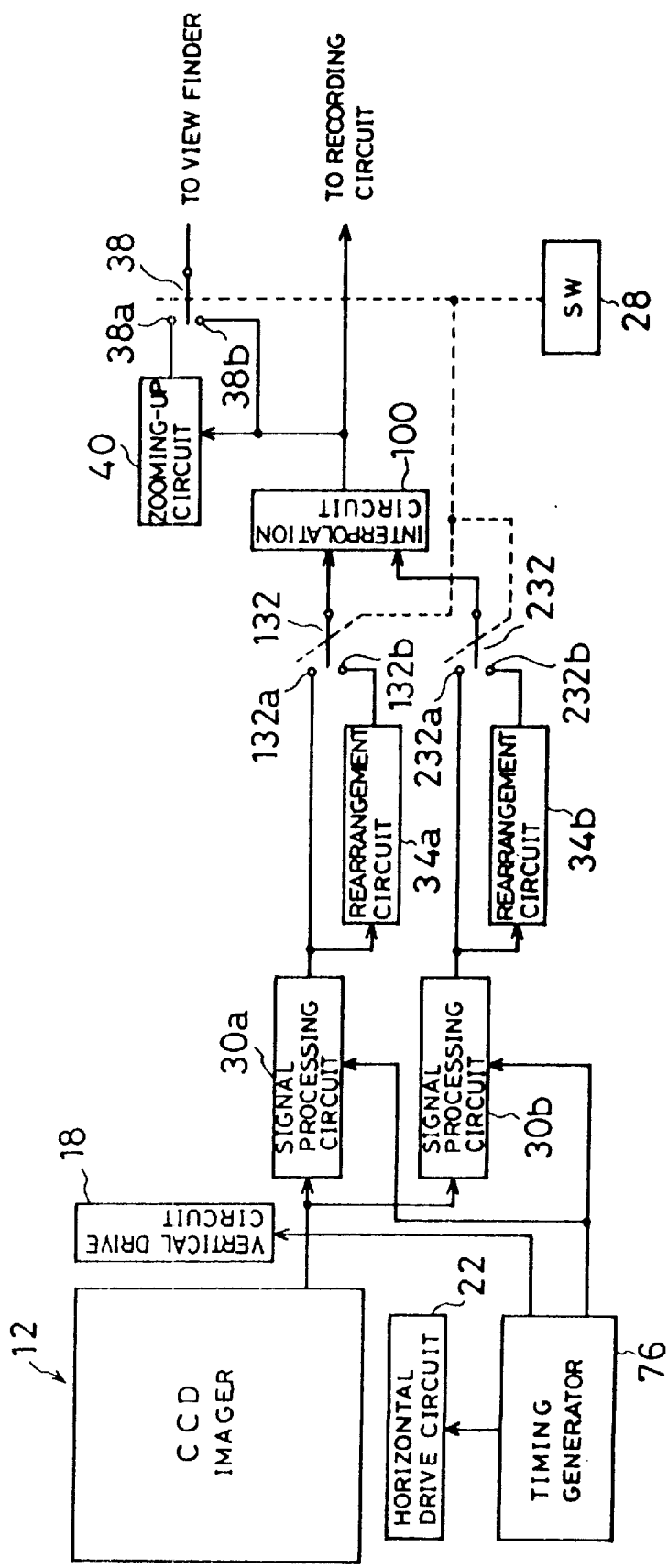
FIG. 1 is a block diagram showing a first embodiment of the invention.

A digital video camera 10 of a first embodiment shown in FIG. 1 includes a solid-state imaging device unit or CCD imager 12, and this solid-state imaging device unit 12 includes as shown in FIG. 3 the number of M of photodiodes 14 for photoelectric conversion and vertical transfer CCDs 16. The vertical transfer CCDs 16 are driven by a vertical driving circuit 18, while a horizontal transfer CCDs 20a and 20b are driven by a horizontal driving circuit 22. The horizontal transfer CCDs 20a and 20b are arranged in parallel therewith a drain 24, which drain 24 is utilized for sweeping off unwanted electric charges during high-speed photographing. That is, the electric charges, which have delivered through sweep-off control gates 26 from the horizontal transfer CCDs 20a and 20b, are swept off out of the drain 24.

The solid-state imaging device unit or CCD imager 12 is attached with a primary-color filter shown in FIG. 2, so that signals of the same number of lines as the number of pixels in a vertical direction, i.e. 480 are read out of the horizontal transfer CCDs 20a and 20b. That is, this solid-state imaging device unit 12 is of dual-channel structure that is intended to improve on a resolution by once reading out data of all pixels in one field, without mixing electric charges between vertical two pixels.

Figure 4:
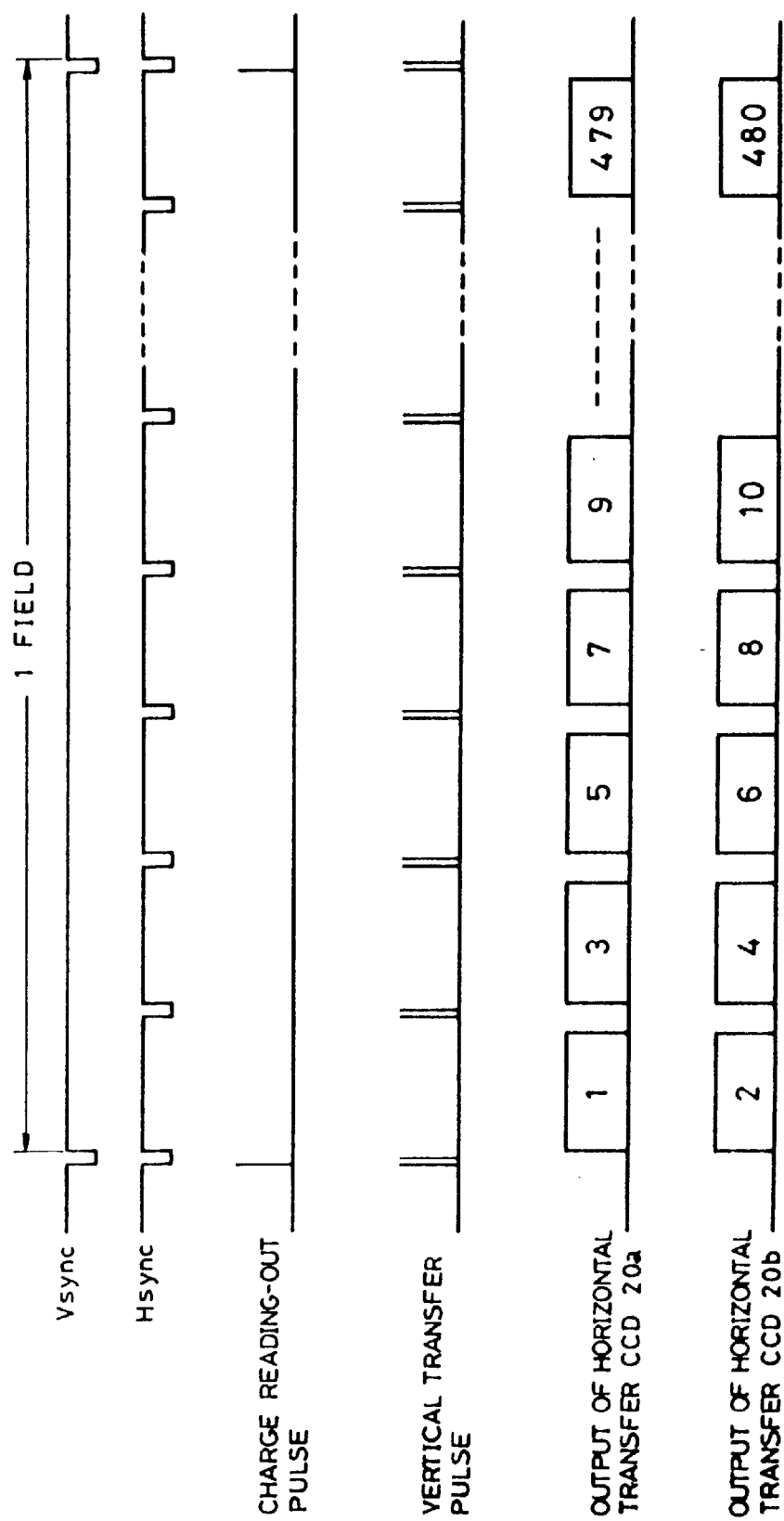
FIG. 4 is a timing chart showing an operation of an ordinary-speed photographing mode (first photographing mode) in the embodiment of FIG. 3.

In an ordinary-speed photographing mode, the solid-state imaging unit or CCD imager 12 operates in accordance with a field storage mode shown in FIG. 4. That is, the electric charges stored on photodiodes 14 are read once per one field to the vertical transfer CCDs 16. Thereafter, two vertical transfer pulses are successively supplied to the vertical transfer CCDs 16, and electric charges of two lines are simultaneously transferred once per 1H respectively to the horizontal transfer CCDs 20a and 20b. The horizontal transfer CCDs 20a and 20b each output electric charges of one line per 1H depending upon a horizontal transfer clock. That is, the horizontal CCDs 20a outputs an output of an odd line, 1, 3, 5 . . . , as a first channel output therefrom, while the horizontal CCDs 20b outputs an output of an even line, 2, 4, 6 . . . , as a second channel output therefrom. This enables outputting, from the solid-state imaging device unit 12, of electric charges for all the pixels included in an effective pixel area and a shield area shown in FIG. 12.

Figure 5:
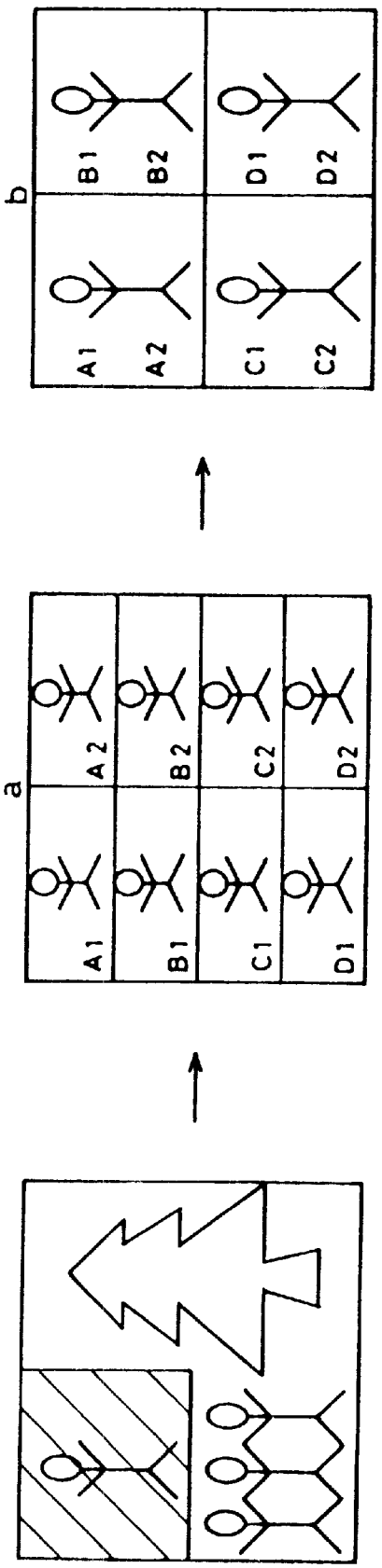
FIG. 5 is an explanatory diagram showing an arrangement of a screen for a quadruple-speed photographing mode in the embodiment of FIG. 1.
Figure 13:
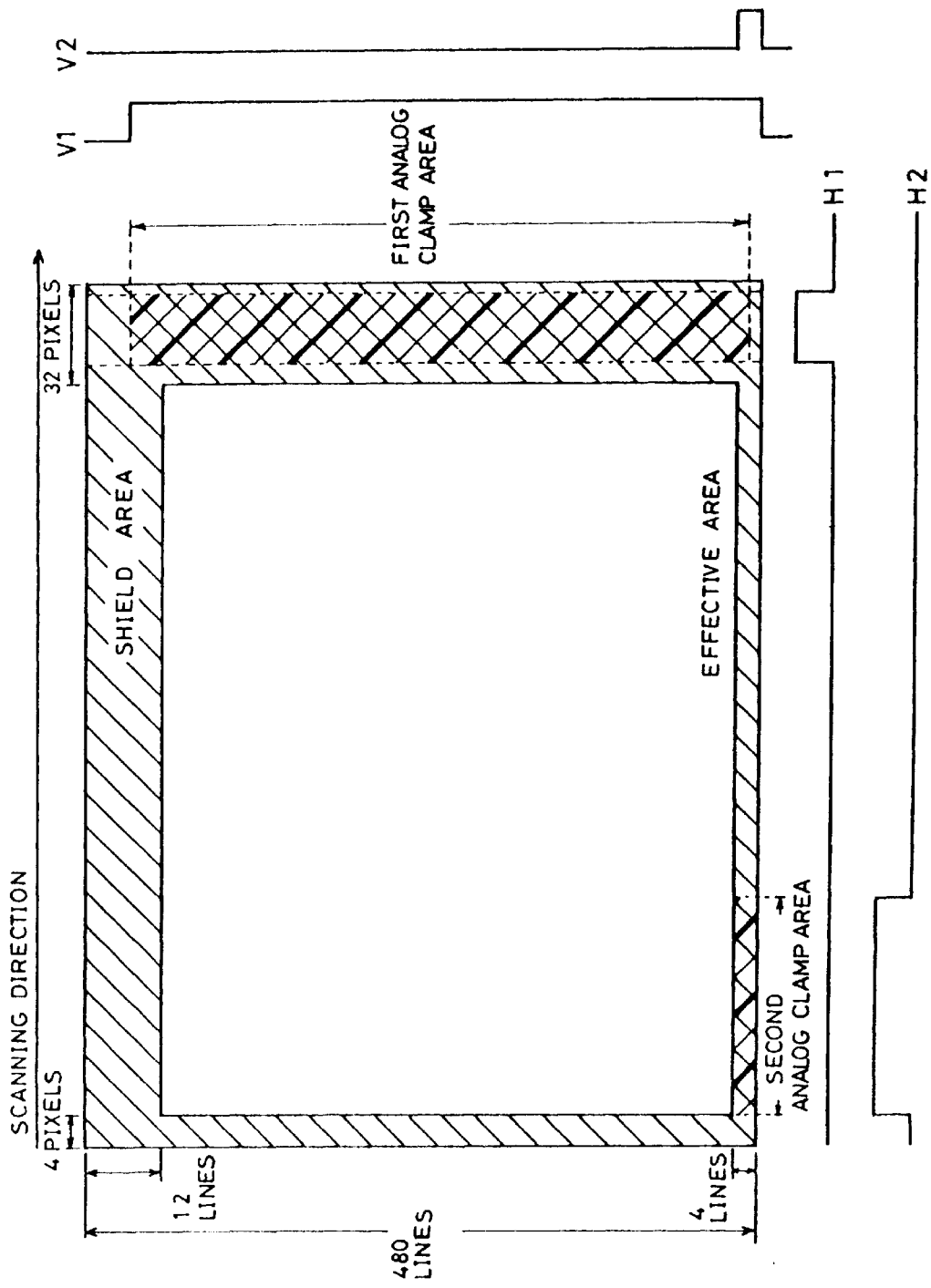
FIG. 13 is an explanatory diagram showing a first analog clamp area and a second analog clamp area for performing analog clamping in an embodiment of FIG. 9.

On the contrary, when a quadruple-speed switch 28 in FIG. 1 is manipulated, i.e. in a case of quadruple-speed photographing, the output from the ¼ region on upper left in the ordinary-photographing CCD output denoted by internal hatching as shown in FIG. 5(A) is taken out for utilization. This area is, if explained by FIG. 13, a lower left ¼ in the region of the effective pixel area plus the shield area. This is because the image given in FIG. 5(A) is to be reflected upside down by the solid-state imaging device unit.

Figure 6:
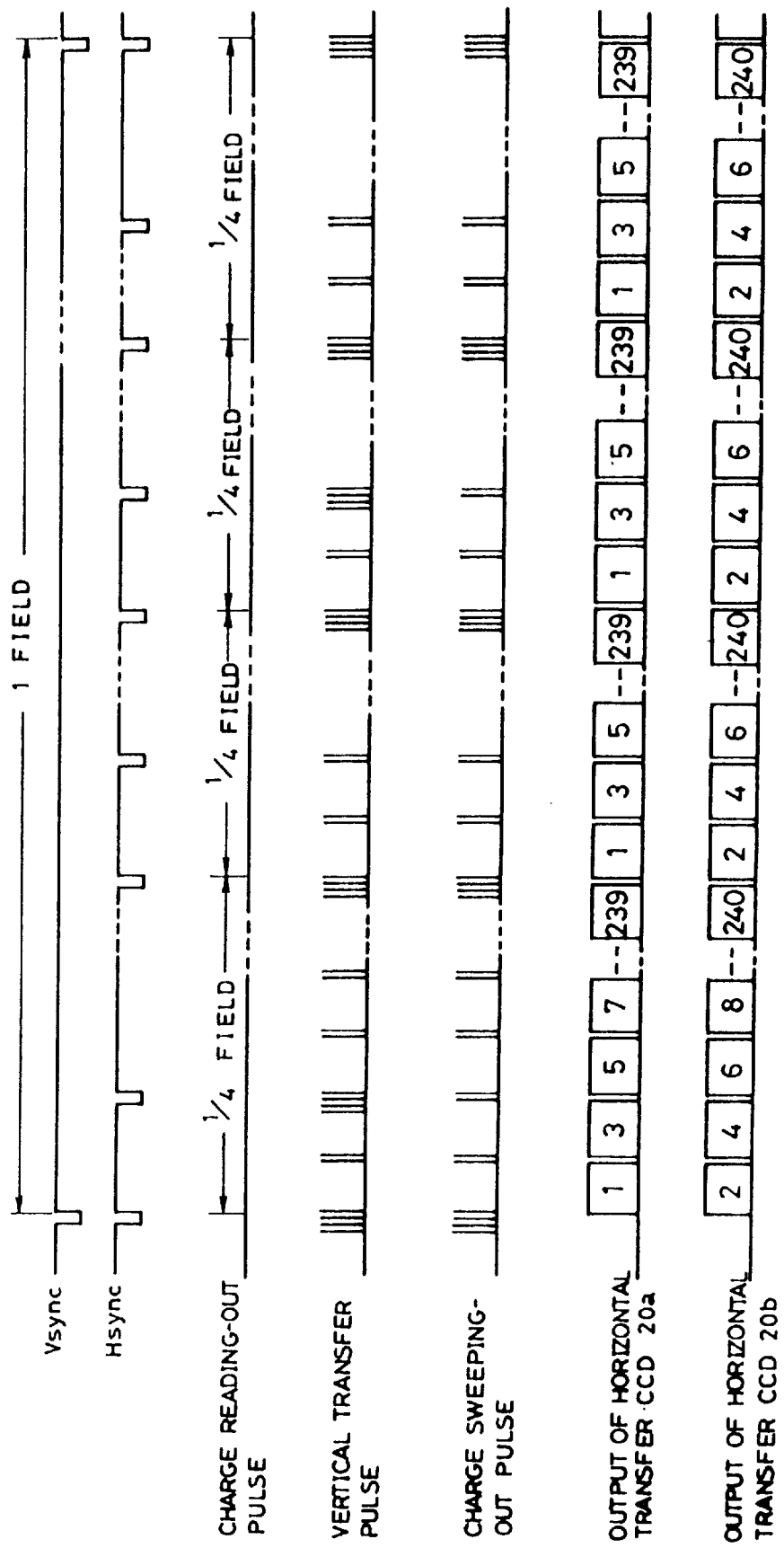
FIG. 6 is a timing chart showing an operation of a quadruple-speed photographing mode (second photographing mode) in an embodiment of FIG. 2.
Figure 8:
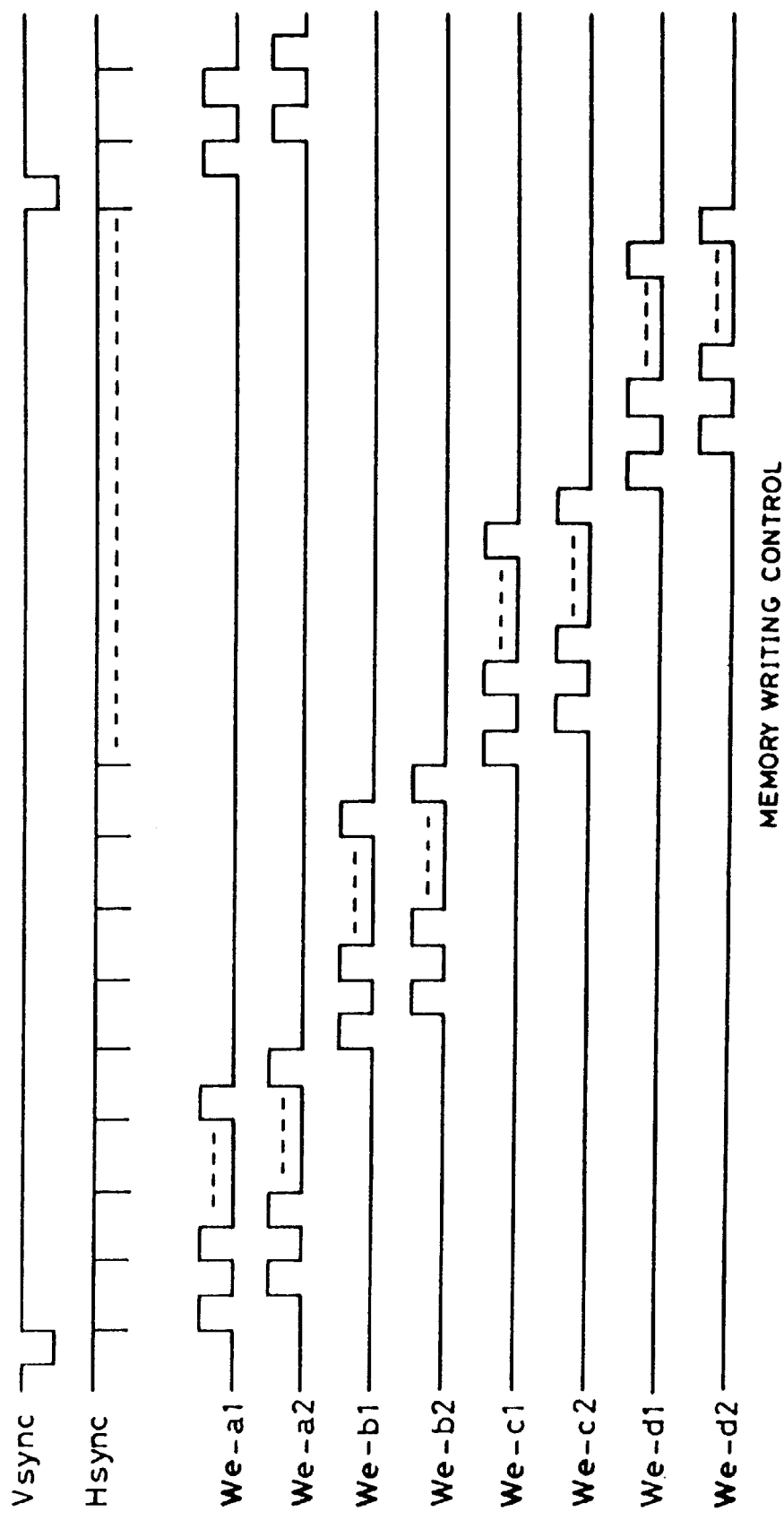
FIG. 8 is a timing chart showing an operation of writing-in of a memory for the embodiment of FIG. 7.

Detailing further on the quadruple-speed photographing mode (second photographing mode), an electric-charge read-out pulse in this mode is supplied once per ¼ field to the vertical transfer CCDs 16 as shown in FIG. 6. Further the vertical transfer CCDs 16 are driven by vertical transfer pulses outputted 2 in number every ½H and in number of 240 during a horizontal blanking period every ¼ field. Accordingly, the electric charges of two lines are transferred every ½H to the horizontal transfer CCDs 20a and 20b. That is, since the horizontal transfer CCDs 20a and 20b are driven by the same horizontal transfer clock as the aforesaid ordinary photographing mode, while the electric charges for the first half of one line have been transferred but the electric charges for the latter half thereof still remain left, the electric charges for the next line are transferred to come from the vertical transfer CCDs 16.

On the other hand, at that time a sweep-off pulse is supplied to thereby open the sweep-off control gate 26. Accordingly, the electric charges for the latter half of the one line are swept off from the drain 26 through the sweep-off control gate 26. That is, in the quadruple-speed photographing mode, the electric charges only for the first half on each line are outputted from the horizontal transfer CCDs 20a and 20b, while the electric charges for the latter half on each line are swept off from the drain 24. Specifically, the first half signals on odd lines 1 to 239 are outputted from the horizontal transfer CCD 20a, and the first half signals on even lines 2 to 240 are outputted from the horizontal transfer CCD 20b. Incidentally, the electric charges for pixels involved in the first four lines, amongst the electric charges outputted out of the vertical transfer CCDs 16, are the electric charges being in the shield area.

Accordingly, in the quadruple-speed photographing mode, one screen is constituted by eight images which are horizontally compressed to ½ in image at the upper left ¼ portion of the CCD screen. Here, the images on the left and right are images to be respectively formed by the odd line and the even line on the same time base.

In this manner, the solid-state imaging device unit 12 operates on the ordinary photographing mode when the quadruple-speed switch 28 is not manipulated, and operates on the quadruple-speed mode when the quadruple-speed switch 28 is manipulated. In either case, the camera signal from the solid-state imaging device unit or CCD imager 12 is delivered by each channel to the signal processing circuits 30a and 30b where it is subjected to processing such as AGC, analog clamping, A/D conversion, digital clamping, etc. Therefore, color camera signals are outputted from the signal processing circuits 30a and 30b.

The color camera signal from the signal processing circuit 30a is delivered as it is to a contact 32a of a switch 132, and to a contact 132b of the switch 132 through a rearrangement circuit 34a. The color camera signal from the signal processing circuit 30b is delivered as it is to a contact 232a of a switch 232, and to a contact 232b of a switch 232 through a reordering circuit 34b. The switches 132 and 232 are in interlocking to a quadruple-speed switch 28, so that they are connected to the contacts 132a and 232a when the quadruple-speed switch 28 is off and connected to the contacts 132b and 232b when the quadruple-speed switch 28 is on. Accordingly, from the switches 132 and 232 are outputted the color camera signals from the signal processing circuits 30a and 30b when the quadruple-speed switch 28 is off, and the color camera signals from the reordering circuits 30a and 30b are outputted therefrom when the quadruple-speed switch 28 is on.

The reordering circuit 34a, as shown in FIG. 7, includes eight memories a1, a2, b1, b2, c1, c2, d1, and d2, and a memory control circuit 36. The respective memories a1, a2, b1, b2, c1, c2, d1, and d2 are a memory for ⅛ screen to store signals for eight regions A1, A2, B1, B2, C1, C2, D1 and D2 shown in FIG. 5. That is, during writing-in of the memories a1, a2, b1, b2, c1, c2, d1 and d2, the memories a1 and a2 are alternately written with signals every ½H for a first ¼ field, and the memories b1 and b2 are alternately written with signals every ½H for a next ¼ field. In this manner, all the memories a1, a2, b1, b2, c1, c2, d1 and d2 are written with color camera signals.

Figure 9:
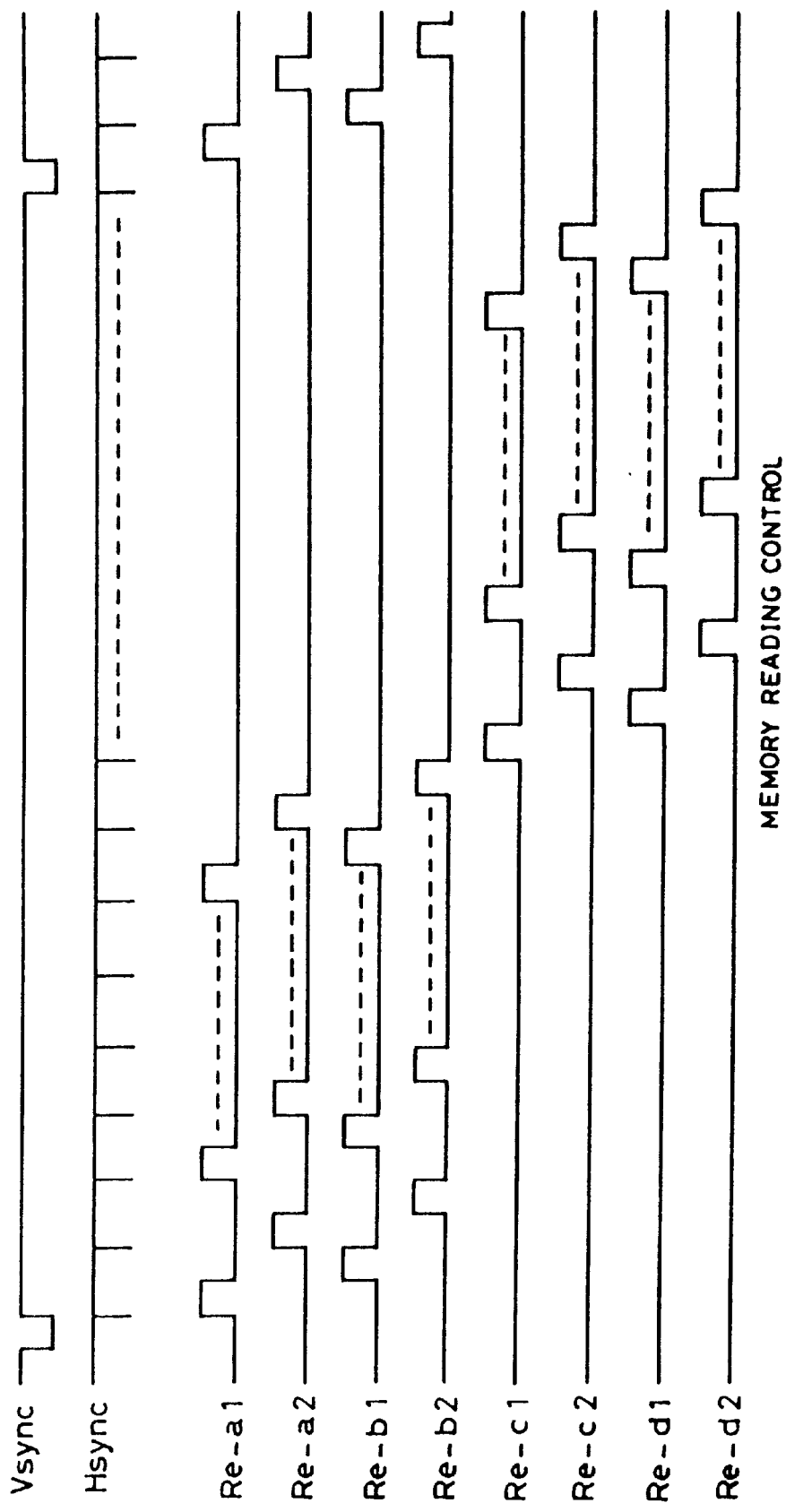
FIG. 9 is a timing chart showing an operation of reading-out of a memory for the embodiment of FIG. 7.

During reading out, as shown in FIG. 9, the memories a1, b1, a2 and b2 are repeatedly read out in order responsive to a read enable signal for a first ½ field period (first half field), and the memories c1, d1, c2 and d2 are repeatedly read out in order for a next ½ field period (latter half field). Incidentally, the reordering circuit 34b is similarly configured to the reordering circuit 34a, and duplicated descriptions will be omitted.

In this manner, the color camera signals shown in FIG. 5(C) are outputted from the reordering circuit 34a and 34b. The color camera signal outputted from the switches 132 and 232 is inputted to an interpolation processing circuit 100. The interpolation processing circuit 100 is configured as in FIG. 10. That is, a first channel output inputted through the switch 132 is supplied directly or through a 1H delay circuit 116 respectively as D0 and D2 to a selecting circuit 118, and a second channel output inputted through the switch 232 is supplied directly or through a 1H delay circuit 117 respectively as D1 and D3 to the selecting circuit 118. The 1H delay circuits 116 and 117 are memories which can store an inputted CCD output for a 1H time period, with a result that a CCD output with 1H delay is obtained by passing a signal through the same circuit. Incidentally, write-in or read-out of a signals to the 1H delay circuit is executed in synchronism with the horizontal transfer in the horizontal transfer CCD.

The selecting circuit 118 selects digital signals of 3 lines out of digital signals of adjacent 4 lines depending upon whether a field under processing is of an odd field or an even field. For the odd field, D0 to D3 are respectively outputted as L0 to L2, whereas for the odd field D0 to D2 are respectively outputted as L0 to 2.

The outputs L0 to L2 of the selecting circuit 118 are inputted directly to an interpolation calculating circuit 133 and to a delay circuit 130. Further, the outputs of the delay circuit 130 are inputted to a delay circuit 131. Here, both the delay circuits 130 and 131 have a delay time for one pixel, and the outputs of the delay circuits 130 and 131 are inputted to the interpolation calculating circuit 133. Accordingly, the interpolation calculating circuit 133 is inputted with signals for successive 3 pixels of adjacent 3 lines, i.e. signals for 9 pixels are simultaneously inputted to the interpolation calculating circuit 133.

Figure 11:
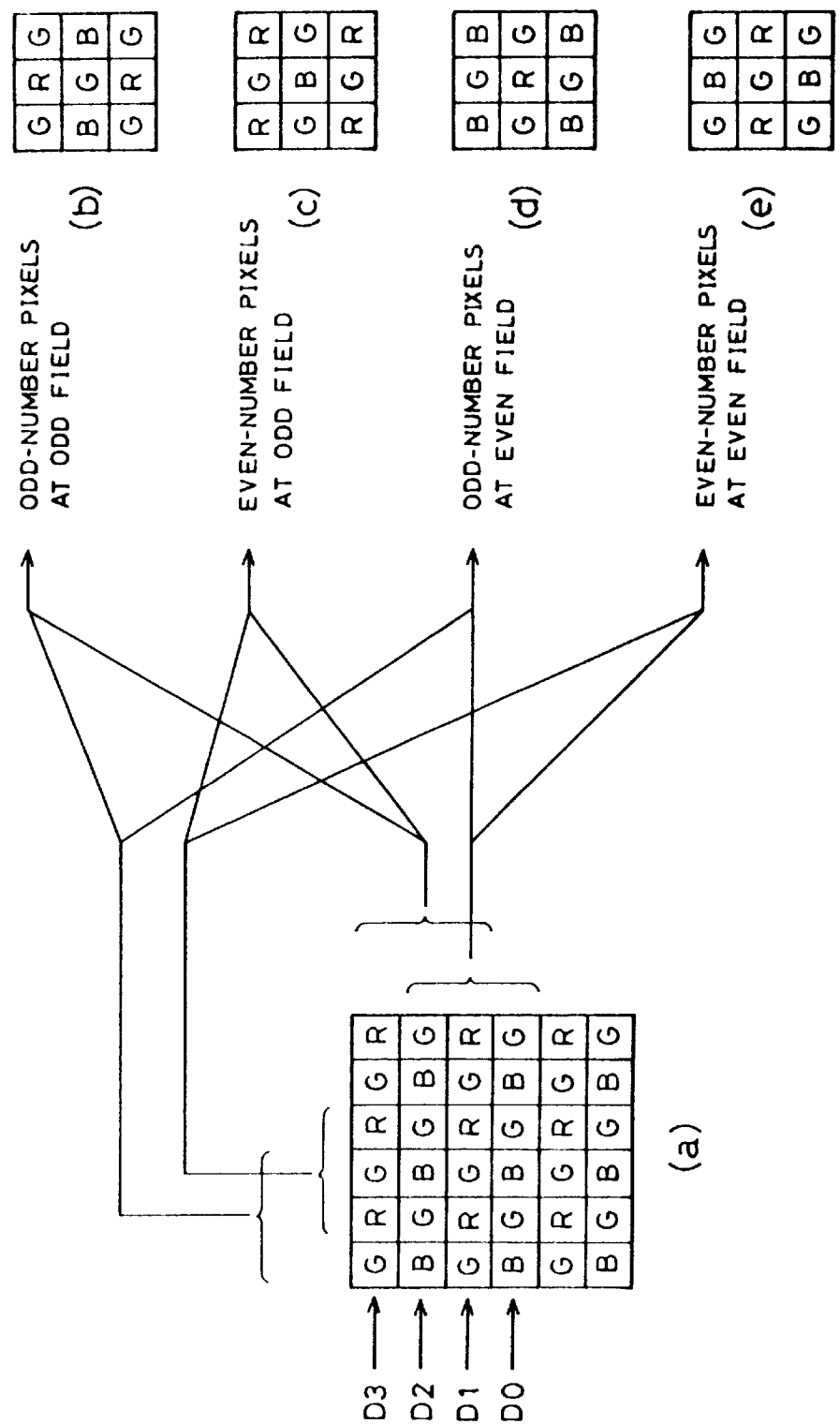
FIG. 11 is a diagram showing an operation of an interpolation process in the interpolation calculating circuit for an embodiment of FIG. 10.

Since the color filter in this embodiment has filters of three primary colors arranged in a mosaic form wherein either only one of R, G and B can be obtained from any of pixels, the signals for the other two colors are interpolated with the surrounding pixels by the interpolation calculating circuit 133. In this case, the relations between the arrangement of pixels on the solid-state imaging unit 12 and pixels to be selected are represented as in FIG. 11. As was stated hereinbefore, during in an odd field, the line signals D1 to D3 are selected so that a pixel pattern at an odd number is represented as FIG. 11(b). Also, a pixel pattern at an even number becomes as shown in FIG. 11(c). Meanwhile, during in an even field, the line signals D0 to D2 are selected so that a pixel pattern at an odd number is represented as FIG. 11(d), whereas a pixel pattern at an even number is represented as shown in FIG. 11(e). Incidentally, FIG. 11(a) demonstrates a typical arrangement of part of pixels on the solid-state imaging unit 12.

Figure 10:
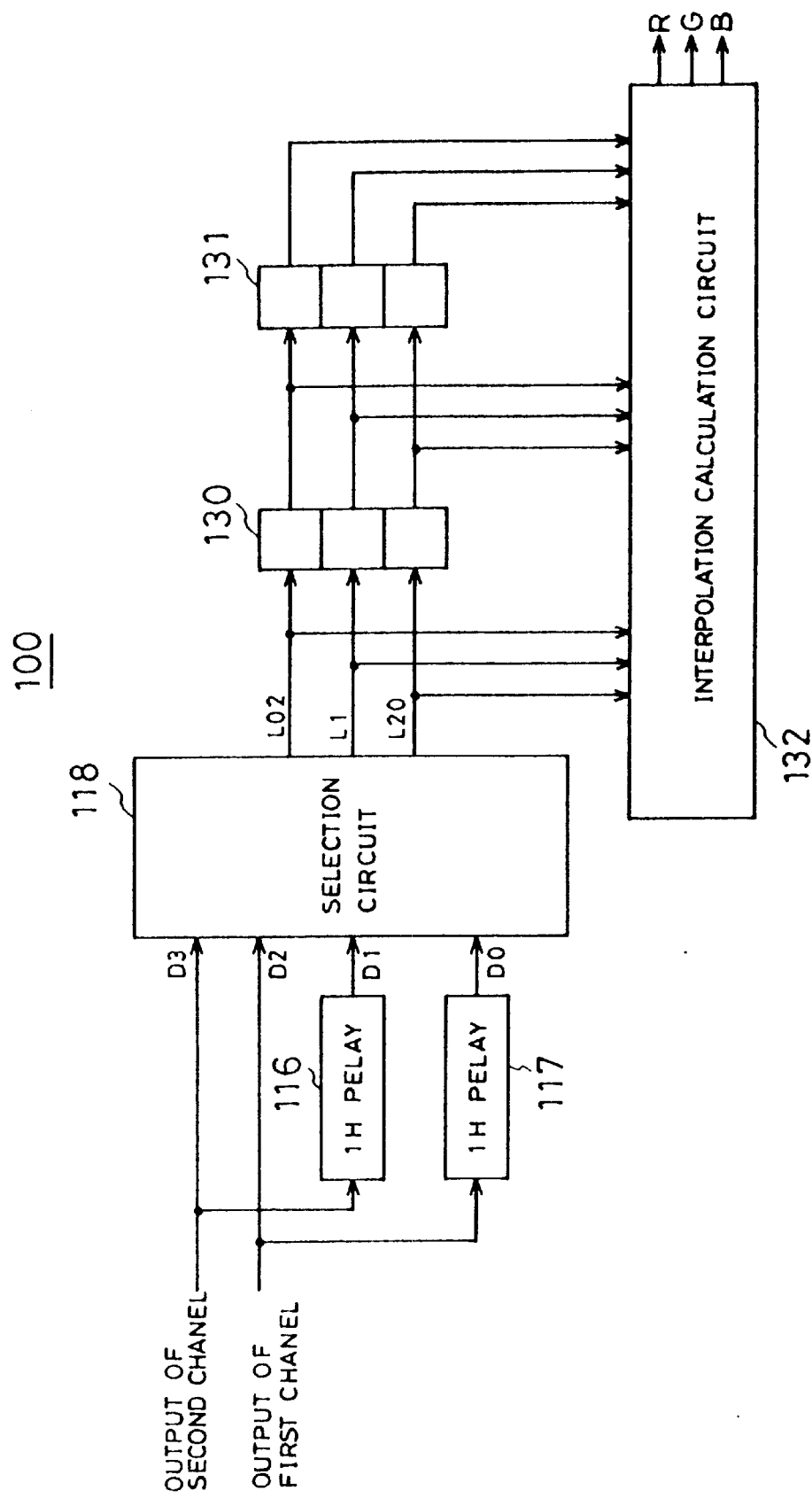
FIG. 10 is a block diagram showing an interpolation calculating circuit for the embodiment of FIG. 1.

As clear from FIG. 10, if determinations are made based on various timing signals whether the field under process is either of an odd field or an even field, and whether the pixel under process is either at an odd number or an even number, then a pixel pattern is determined as any of FIGS. 11(b) to (e). Accordingly, the interpolation calculating circuit 132, for example in the case of FIG. 11(b), obtains a G signal from the central pixel and outputs the G signal as it is, obtains R signals from upper and lower pixels in the centered vertical column and taking an average on these two pixel signals to output as R signals, and obtains B signals from the left and right two pixels in the centered horizontal line and taking an average on these two pixel signals to output as B signals. Also, in the case of (c), R and G signals are available by taking average on the same color signals for adjacent four pixels.

In this manner, the signals for the pixels under process lacking two colors are prepared and interpolated by the peripheral same-colored pixel signal, thereby outputting R, G, and B signals for pixels.

The color camera signal outputted from the interpolation calculating circuit 132 is delivered to a recording circuit (not shown), as well as to a contact 38a of a switch 38 and to a contact 38b of the switch 38 by way of a zooming-up circuit 40. The magnifying circuit 40, in the quadruple-speed photographing mode, magnifies twice the color camera signal from the switch 32 in respective horizontal and vertical directions. The switch 38 interlocks to the quadruple-speed switch 28, similarly to the aforesaid switch 32. Consequently, when the quadruple-speed switch 28 is off, the color camera signal from the switch 32 is delivered as it is to a viewfinder (not shown), while, when the quadruple switch 28 is on, the viewfinder is delivered with a color camera signal magnified by the magnifying circuit 40 to be outputted from the switch 38.

So far explained were the ordinary photographing mode, i.e. the first photographing mode, and the quadruple-speed photographing mode, i.e. the second photographing mode, of the digital video camera 10. A clamping process in the signal processing circuit 30a will be explained hereinbelow. Incidentally, the clamping process in the signal processing circuit 30a also similar to the signal processing circuit 30b, and duplicated explanations will be omitted.

Figure 12:
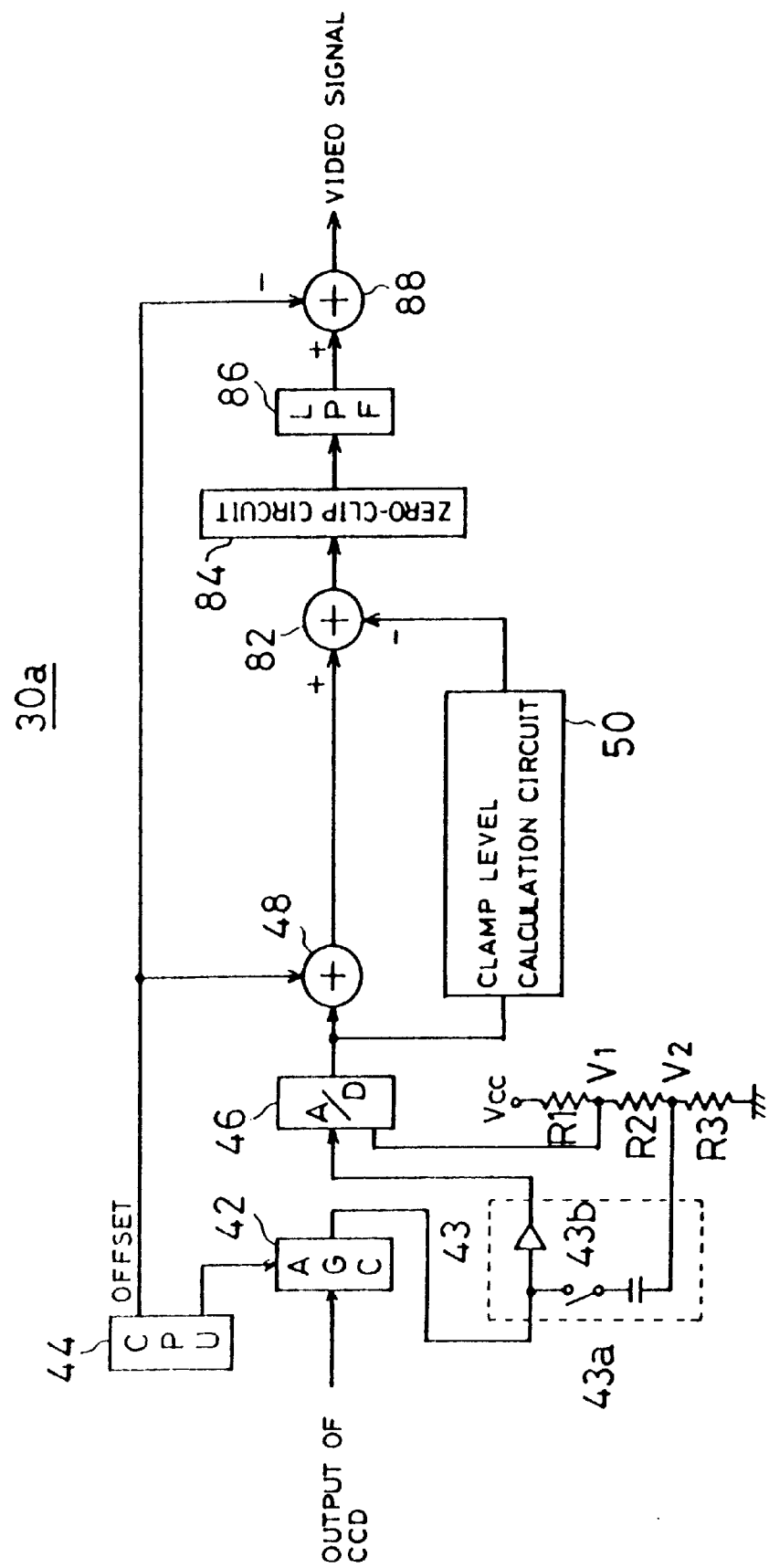
FIG. 12 is a block diagram showing a signal processing circuit in the embodiment of FIG. 1.

The signal processing circuit 30a shown in FIG. 12 of this embodiment includes an automatic gain control (AGC) circuit 42 for receiving an output signal, which has been removed of reset noise by a correlated double sampling circuit (not shown), from the solid-state imaging device unit or CCD imager 12. This AGC circuit 42 processes an output signal from the solid-state imaging device unit 12 to an optimal amplitude in dependence upon an AGC voltage from the AGC-voltage generating circuit (not shown) for generation of an AGC voltage based on a gain control signal delivered as for example a PWM signal from a CPU 44.

The output signal adjusted in amplitude by the AGC circuit 42 is clamped by the analog clamp circuit 43. More specifically, a switch 43a included in the analog clamp circuit 43 is turned on corresponding to, in a shield area shown in FIG. 13, a first analog clamp area set at a rear edge of each line or a second analog clamp area set at a lower edge to an effective pixel area. That is, in the ordinary-speed photographing mode the switch 43a is turned on by gate signals of a vertical pulse V1 and a horizontal pulse H1 corresponding to the first analog clamp area, whereas in the quadruple-speed photographing the switch 43a is turned on by gate pulses of a vertical pulse V1 and a horizontal pulse H2 corresponding to the second analog clamp area. This causes the output signal of the AGC circuit 42 to be clamped at a reference voltage V2, and the clamped signal is inputted to an A/D converter 46 through a buffer amplifier 43a.

The A/D converter 43 is given of a reference voltage V1 by which a minimal value level of the A/D converter is prescribed. Consequently, the A/D converter 46 quantizes an input signal with the reference voltage V2 as reference, creating a digital signal. Incidentally, the reference voltages V1 and V2 are obtained by voltage-dividing a power supply voltage Vcc with resistances R1 to R3, resulting in the reference voltage V1>V2.

In this manner, the digital signal is adjusted in black level by clamping the output signal from the AGC circuit 42 by the reference voltage V2 and quantize it with the reference voltage V1 as a minimum value. The adjustment like this is due to the following reason. That is, although the digital signal from the A/D converter 46 is clamped at a level shown in FIG. 21(A) and FIG. 22(A), if the black level of the digital signal outputted from the A/D converter 46 rises excessively high or falls excessively low, there occurs saturation in white level for the digital signal or saturation in part of random-noise components superimposed by the black level, with the result that the dynamic range is reduced small or "black floating" becomes impossible to be prevented.

Also, the first analog clamp area and the second analog clamp area are set such that their respective horizontal ends are respectively positioned at first and second clamp areas so that analog clamping will not have adverse effects on digital clamping. That is, in the ordinary-speed photographing mode, the turning on/off of the switch 43a at both horizontal ends of the first analog clamp area causes superposition of noise on the output signal from the AGC circuit 42, as shown in FIG. 15. However, as will be understood from FIG. 13 and FIG. 14, since the first analog clamp area is set broader than the first digital clamp area, there is no possibility that this noise badly influences upon the later processes. Also, in the quadruple-speed photographing mode, a second analog clamp area and a second digital clamp area are set such that they are not overlapped with so that, in also this mode, the noise caused during analog clamping will not badly affect the digital clamping.

The digital signal is delivered to an adding circuit 48 and a clamp-level calculating circuit 50. In the adding circuit 48, an offset value given from an CPU 44 is added to the digital signal outputted from the A/D converter 46. The offset value is preferably set in accordance with the magnitude of a gain to be set in the AGC circuit 42. For example, where the gain of the AGC circuit 42 is great the offset value is rendered large, and where reverse the offset value is rendered small.

Figure 14:
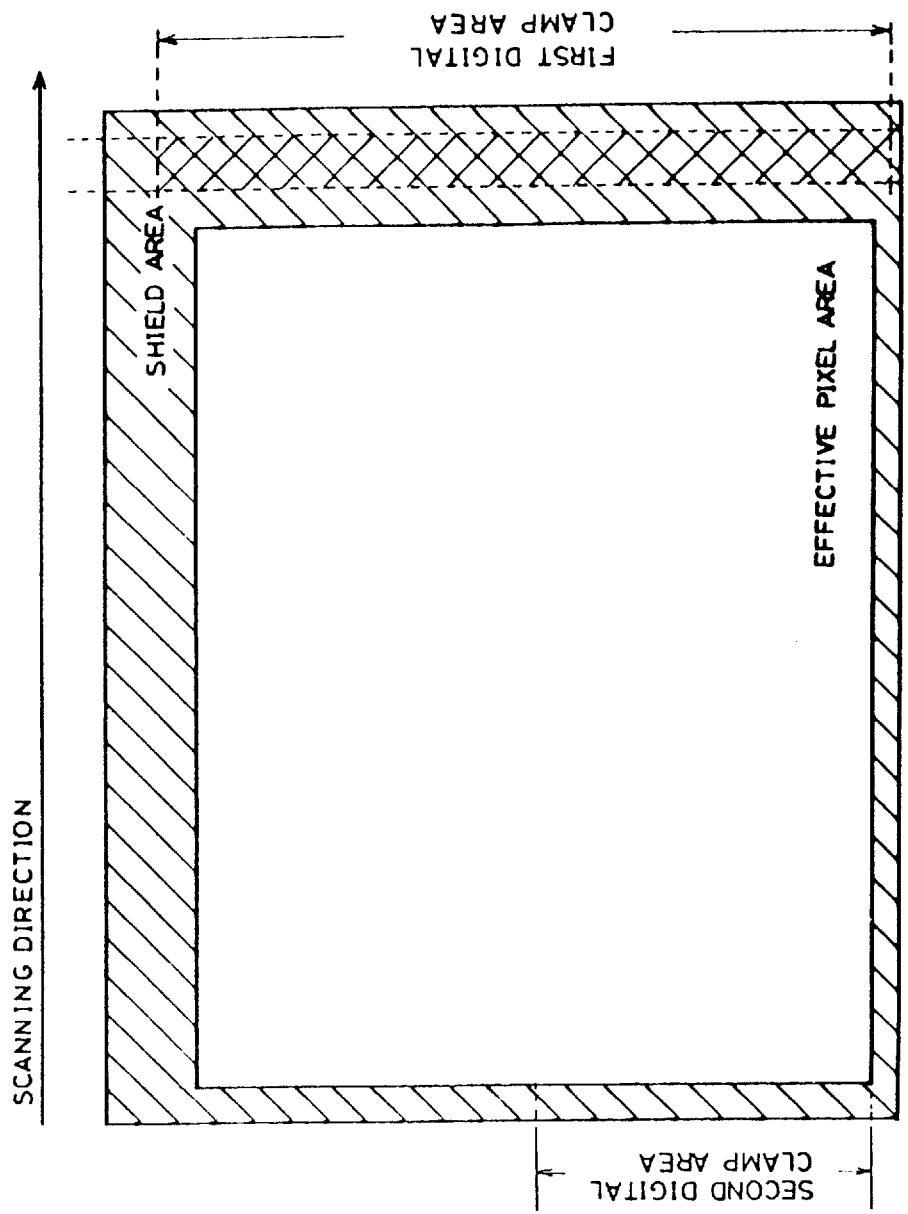
FIG. 14 is an explanatory diagram showing a first analog clamp area and a second analog clamp area for performing analog clamping in an embodiment of FIG. 12.
Figure 15:
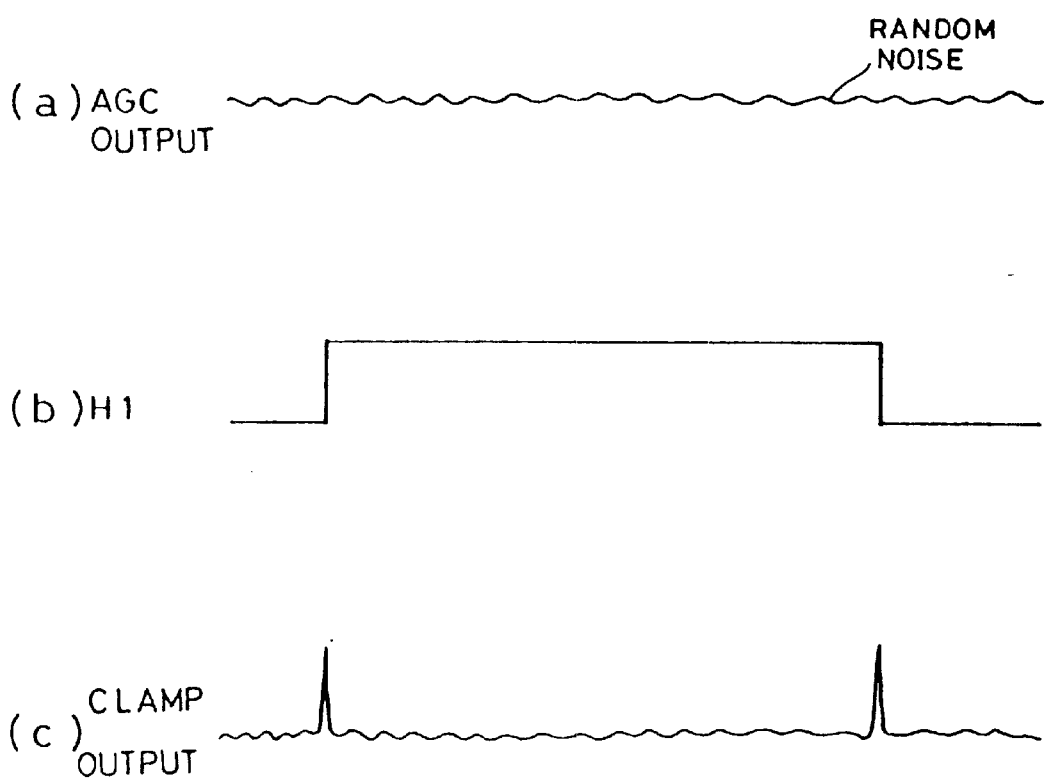
FIG. 15(a) is a waveform showing an output of an AGC circuit.
FIG. 15(b) is a waveform showing a horizontal pulse H1.
FIG. 15(c) is a waveform showing an analog clamp circuit output.

Meanwhile, the clamplevel calculating circuit 50, to be brief, calculates an average value (referred to as "OB level") of an optical black (OB) portion of each line in a first digital clamp area set at a rear edge of each line or a second digital clamp area set at a front edge of each line, in a shading area shown in FIG. 14, to calculates a clamp level based thereon. Specifically the clamp level calculating circuit 50 is shown in FIG. 16.

Figure 16:
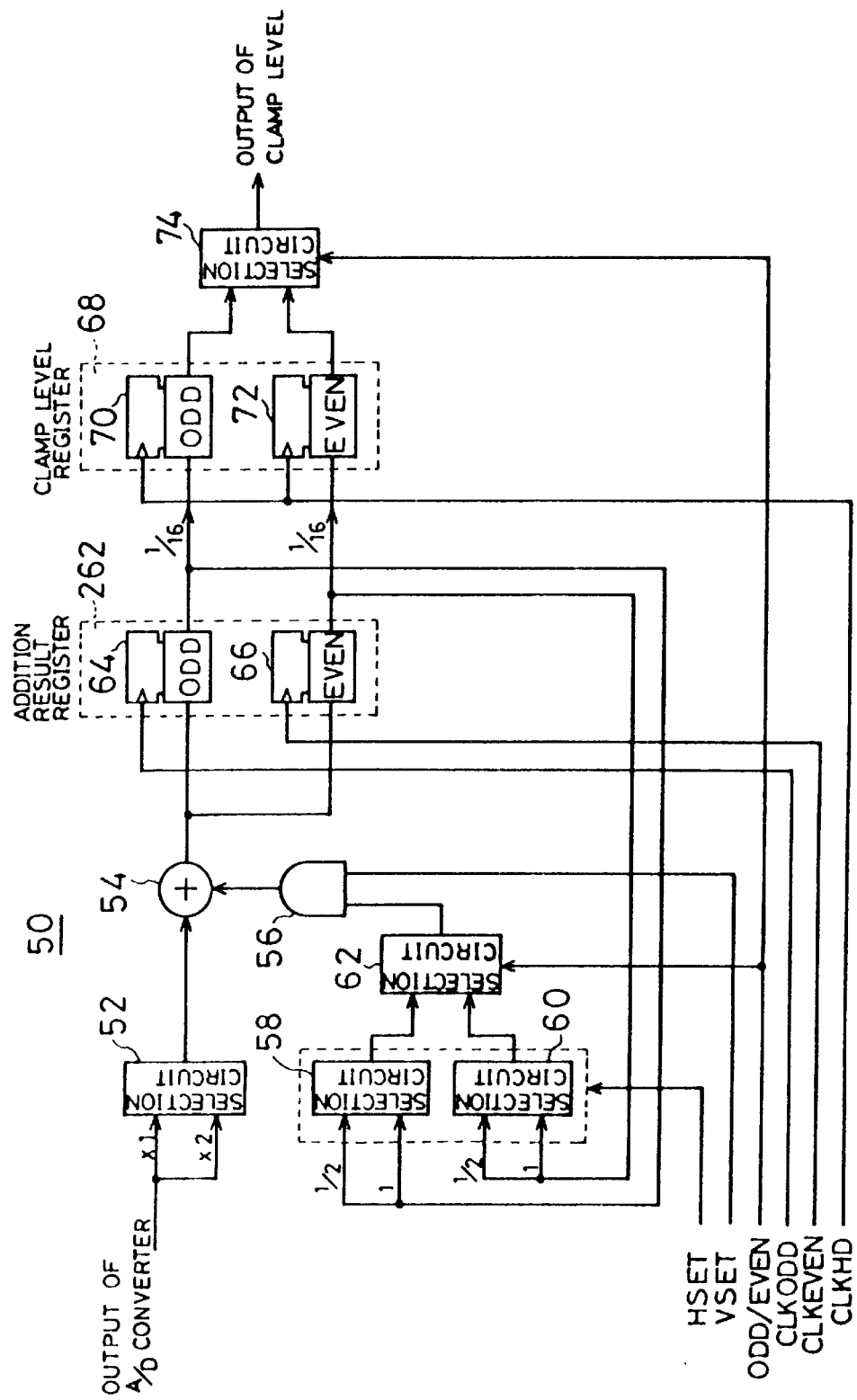
FIG. 16 is a block diagram showing one example of a clamp-level calculating circuit in the embodiment of FIG. 12.

Referring to FIG. 16, the clamp level calculating circuit 50 includes a selecting circuit 52 for receiving a digital signal (input data) of for example 8 bits from the A/D converter 46. This selecting circuit 52 selectively outputs one times the input data ((1) or two times thereof ((2) to deliver it to an adding circuit 54. The adding circuit 54 is delivered with data selected by a selecting circuits 58, 60 through an AND gate 56. The AND gate 56 is controlled by a signal VSET shown in FIG. 17 and FIG. 18. The signal VSET is a signal that becomes a low level only at respective odd and even one pixels at which the first digital clamp area and the second digital clamp area begins.

Figure 18:
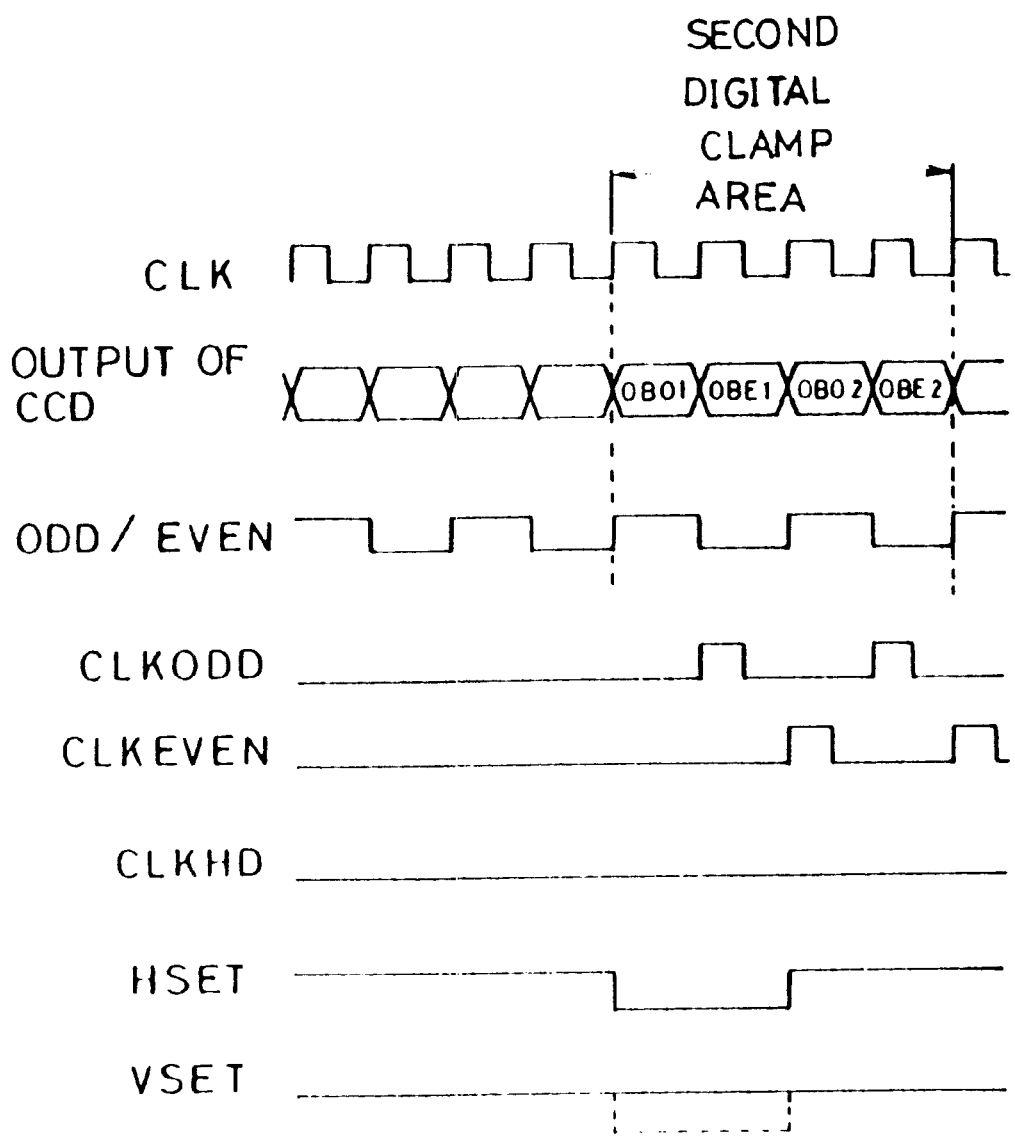
FIG. 18 is a timing chart showing the operation of the clamp-level calculating circuit of FIG. 16 in a second predetermined period.

Also, the selecting circuits 58 and 60 are controlled by a signal HSET shown in FIG. 17 and FIG. 18, to selectively output ½ times (½) or one times (1) a data delivered. This signal HSET, as shown in FIG. 17 or FIG. 18, is a signal that becomes a low level at odd-and-even two pixels at a beginning end for the first digital clamp area or the second digital clamp area on each line. The selecting circuit 62 is controlled by a signal ODD/EVEN, which selects to output an output of the selecting circuit 58 when the signal ODD/EVEN is at a high level, and an output of the selecting circuit 60 when at a low level. This signal ODD/EVEN, as shown in FIG. 17 or FIG. 18, goes to a high level for an odd pixel of the CCD and to a low level for an even pixel.

Further, the output of the adding circuit 54 is delivered to an adding register 262. This adding register 262 includes an odd register 64 and an even register 66, so that an odd pixel data of the output of the adding circuit 54 is delivered to the odd register 64 and an even pixel data is delivered to the even register 66. The outputs from the odd register 64 and the even register 66 are respectively delivered to the aforesaid two selecting circuits 58 and 60, as well as to an odd register 70 and an even register 72 included by a clampvalue register 68. The adding register 262 latches the output from the adding circuit 54, while the clamp-value register 68 latches the output from the adding register 262. Note that the outputs from the odd register 64 and the even register 66 of the adding register 262 are respectively rendered ¹⁄₁₆ to be latched to the odd register 70 and the even register 72 of the clamp-value register 68.

The odd register 64 of the adding register 262 receives a signal CLKODD as a latch signal, whereas the even register 66 receives CLKEVEN as a latch signal. As shown in FIG. 17 and FIG. 18, the signal CLKODD is a clock that is outputted on every odd pixel, and the signal CLKEVEN a clock outputted on every even pixel. The odd register 70 and the even register 72 of the clamp-value register 68 are delivered with a signal CLKHD as a common latch timing signal. The signal CLKHD is a signal that goes to a high level only at one pixel at the right end of each line shown in FIG. 14.

The outputs of the odd register 70 and the even register 72 of the clamp-value register 68 are delivered to a selecting circuit 74. The selecting circuit 74 is controlled by the signal ODD/EVEN similarly to the aforesaid selective circuit 62, and select to output an output of the odd register 70 when the signal ODD/EVEN is at the high level and an output of the even register 72 when at the low level.

Figure 19:
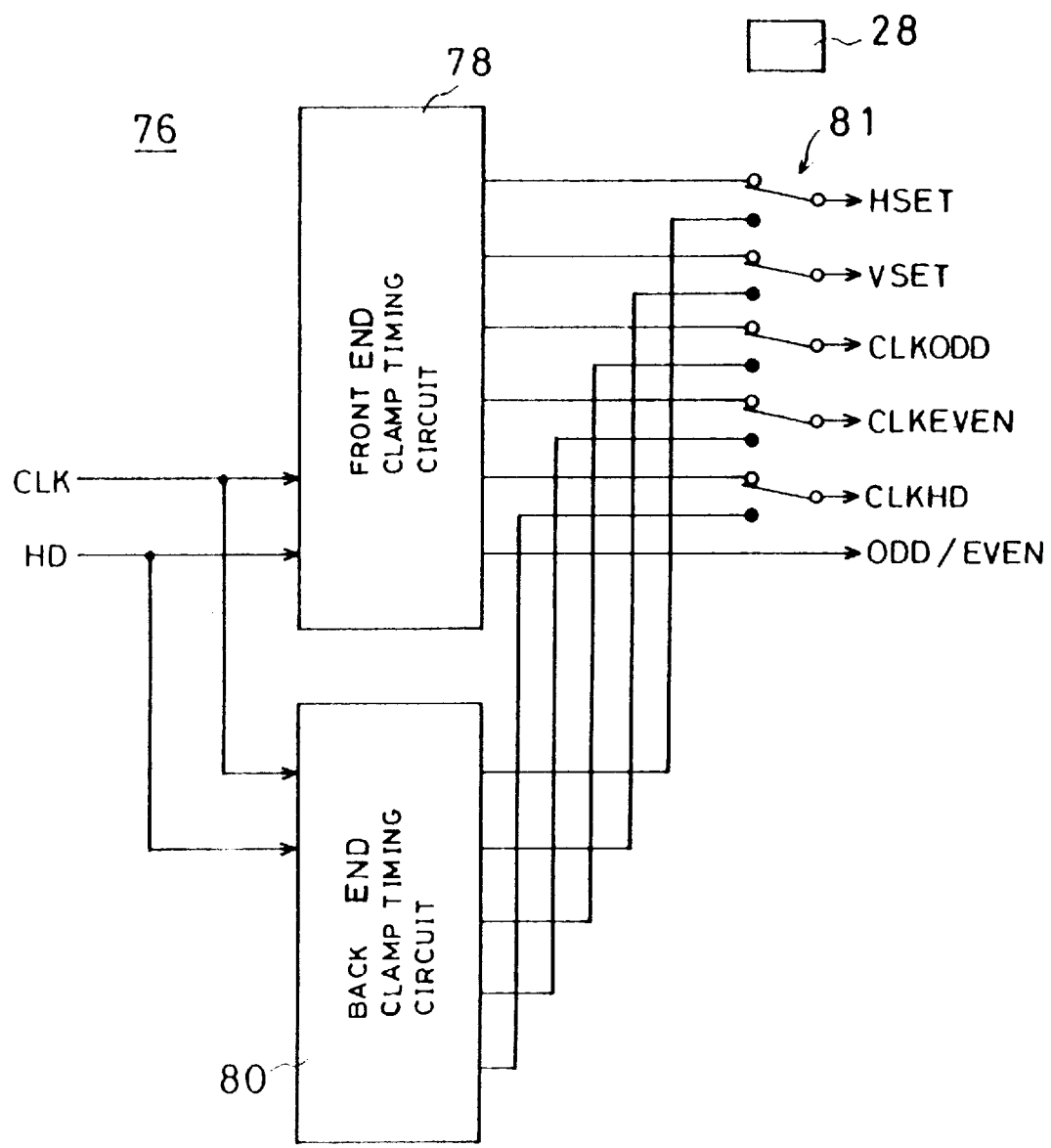
FIG. 19 is a block diagram showing a portion of a timing generator defining the first predetermined period and the second predetermined period in the embodiment of FIG. 12.

Each of timing signals shown in FIG. 17 and FIG. 18 is created by a timing generator 76 shown in FIG. 1. That is, the timing generator 76 includes as part thereof a front-edge clamp timing circuit 78 and a rear-edge clamp timing circuit 80 sown in FIG. 19. The front-edge clamp timing circuit 78 and the rear-edge clamp timing circuit 80 both receive a master clock CLK and a horizontal synchronizing signal HD to prescribe a second digital clamp area (second predetermined time period) and a first digital clamp area (first predetermined time period).

More specifically, the front-edge clamp timing circuit 78 is configured by an appropriate gate circuit and a ROM decoder, to output a timing signal shown in FIG. 18 only for a time (second predetermined time period) for odd two pixels and even two pixels of each line signal in the second digital clamp area, based on the master clock CLK and the horizontal synchronizing signal HD.

The rear-edge clamp timing circuit 80 is similarly configured by an appropriate gate circuit and a ROM decoder, to output a timing signal shown in FIG. 17 only for a time by odd two pixels and even eight pixels of each line signal in the first digital clamp area, based on the master clock CLK and the horizontal synchronizing signal HD.

The output signals of the front-edge timing circuit 78 and the rear-edge timing circuit 80 are switched over by a switch 81 interlocking to the quadruple-speed switch 28 for being outputted. Consequently, the clamp level calculating circuit 50 operates responsive to the timing signals outputted from the front-edge clamp timing circuit 78 or the rear-edge clamp timing circuit 80 of the timing generator 76.

Here, the operation of the clamp level calculating circuit 50 in the first predetermined period will be explained. First, an OB level of 8 pixels is calculated as to odd pixels. For this, the selecting circuit 52 is selected at "(2" at timing of a line to be clamped. Accordingly, the input data is shifted up by one bit with the result that a data two times the input is outputted from the selecting circuit 52. At this time, the signal VSET as an control input to the AND gate 56 becomes a low level as shown in FIG. 17 so that the output of the adding circuit 54 is of a data two times a first odd pixel data outputted from the selecting circuit 52. This two-times data is inputted to each of registers 64 and 66 of the adding register 262, to be latched to the odd register 64 depending on a signal CLKODD shown in FIG. 17. This data latched to the odd register 64 is delivered to the selecting circuit 58. The selecting circuit 58 outputs to the selecting circuit 62 the data one-time multiplied of the input data in accordance with the low level of the signal HSET. The selecting circuit 62 selects an upper side input when the signal ODD/EVEN is at a high level, and selects an lower side input when it is at a low level, with the result that the one-times of odd pixel data from the selecting circuit 58 is delivered from the selecting circuit 62 to the AND gate 56. That is, the data inputted to the AND gate 56 is a data two times the first odd pixel.

When a next odd pixel data is inputted, a two-times data is again delivered from the selecting circuit 52 to the adding circuit 54. At this time, since the signal VSET is at a high level, a data two times the first odd pixel is delivered through the AND gate 56 to the adding circuit 54. Consequently, the adding circuit 54 add the data two times the first odd pixel and the data two times the second odd pixel, and the adding result is latched to the odd register 64 of the adding register 262. The operation like this is thereafter repeated up to an 8th odd pixel, and the odd register 64 of the adding register 262 is resultingly latched with a data of 16 times the input data.

Responsive to the signal CLKHD turning a high level at the right end (termination) on each line on the screen, the data, which is latched to the odd register 64 of the adding register 262, is rendered 1/16 or shifted down by 4 bits to be latched to the odd register 70 of the clamp-value register 68. Accordingly, a selecting circuit 74 outputs an OB level data of odd 8 pixels of a first line in the first digital clamp area (FIG. 14) latched to the odd register 70 responsive to the high level of the ODD/EVEN signal.

The subsequent lines, that is a second line and the subsequent, the selecting circuit 52 selects "(1", and the selecting circuits 58 and 60 select "½" only for the first one pixel and "1" for the subsequent 7 pixels. Accordingly, a 16-times data is outputted from the adding register 62 and rendered "1/16", resulting in outputting of an OB level of 8 pixels on each line from the selecting circuit 74. That is, a recursive filter is configured by a circuit passing from the adding circuit 54 through the adding register 262, the selecting circuits 58, 60 and 62, and the AND gate 56.

Note that, although in this embodiment the weighting coefficient (k) of the recursive filter is set at "½", this coefficient can be set arbitrary within a range of 0<k<1. That is, by setting the coefficient (k) the clamp level of the first line remains in the OB level value as it is, and the clamp level for the line 2 and the subsequent becomes a weighted mean of coefficient (k) for the clamp level of the previous line and a newly obtained OB level. Therefore, even if there is noise contained in the OB portion of the line 2 and the subsequent, the influence thereof is relieved to 1/k times.

Incidentally, although the operation of determining the OB level and calculating the clamp level was explained solely on odd pixels, as for even pixels the operation is similar to the case of odd pixels except that the low level of the signal ODD/EVEN causes the selecting circuits 62 and 74 to select an under side input. In any case, the circuit of FIG. 17 calculates on each odd or even pixel.

Then, the operation of the clamp level calculating circuit 50 for the second predetermined period is similar to the operation of the first predetermined period, and duplicated explanations will be omitted. Note that the OB level of two pixels is calculated for the second predetermined period.

In this manner, the clamp level is outputted from the clamp level calculating circuit 50 to be inputted to a first subtraction circuit 82 shown in FIG. 12. Accordingly, the first subtracting circuit 82 subtracts the clamp level calculated by the clamp level calculating circuit 50 from the data added with the offset value by the adding circuit 50, and the digital signal from the A/D converter 46 is digitally clamped.

The output of the first subtraction circuit 82 is zero-clipped (a negative numeral value is forced to a zero-level) zero-clip circuit 84 including for example such as an OR gate, and then delivered through a digital low-pass filter 86 to a second subtraction circuit 88. The subtraction input to the second subtraction circuit 88 is given of the same offset value as that delivered from the CPU 44 to the adding circuit 48.

Figure 21:
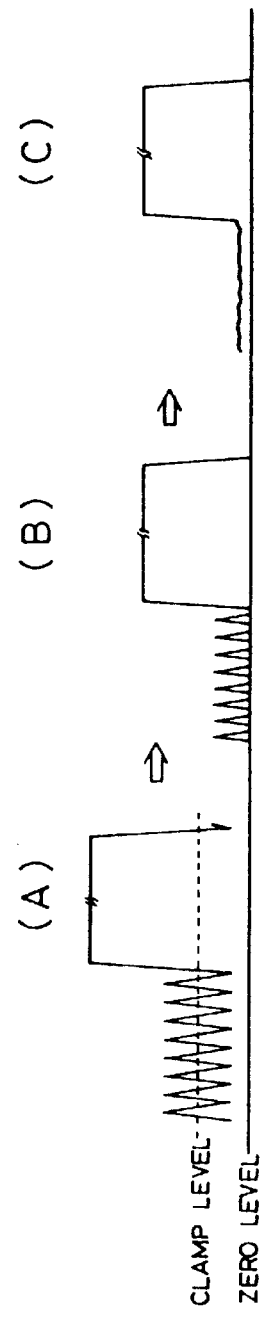
FIG. 21 is a waveform diagram showing a comparative example in a case of adding an offset value without subtraction in the embodiment of FIG. 12.
Figure 22:
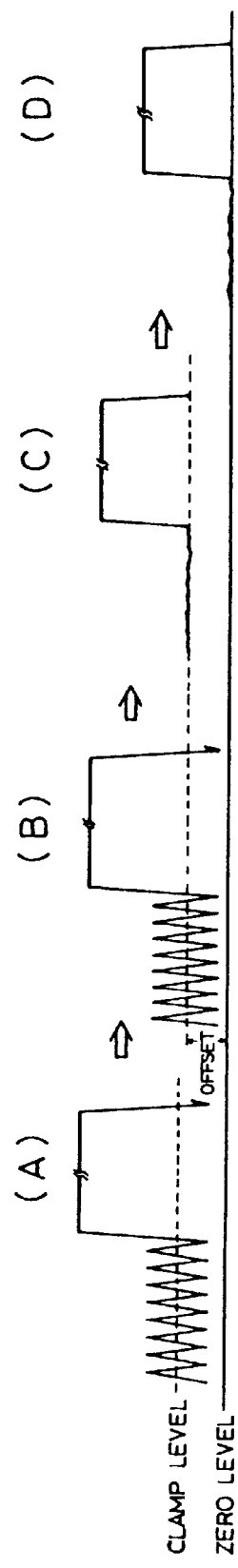
FIG. 22 is a waveform diagram showing an operation of the embodiment of FIG. 12.

That is, explanations will be made in detail on a case of this embodiment that the offset value is added to or subtracted from by the adding circuit 48 and the second subtracting circuit 88, and a case that no offset value is used, with reference to FIG. 21 and FIG. 22. FIG. 21(A) and FIG. 22(A) each shows a CCD output signal (digital signal) for one line outputted from the A/D converter 46 where photographing a subject in black on the left and white on the right. The actual signal assumes a waveform as shown in FIG. 21(A) or FIG. 22(A) because it contains random noises. At this time, the clamp level is at a level denoted by the dotted line, at which level clamping is done by the first subtraction circuit 82.

Where no offset value is added, the output of the zero-clip circuit 84 is a signal as in FIG. 21(B). This signal, if passes through the low-pass filter 80, has a waveform as in FIG. 21(C), wherein a portion of the signal to be in black is not zero and hence there occurs a phenomenon called "black floating".

However, if the offset value is added by the adding circuit 48 conforming to this embodiment, the output signal of the zero-clip circuit 84 has a waveform shown in FIG. 22(B). If this is processed by the low-pass filter 80, the waveform becomes as shown in FIG. 22(C). Thereafter, by subtracting the offset value by the second subtraction circuit 88, the optically-black portion in the signal becomes nearly zero, providing an image signal free from "black floating".

As explained hereinbefore, the offset value is varied in accord with the gain by the AC circuit 42. That is, when the gain is large, noise is also large, so that the offset value is taken great to prevent against black floating. When the gain is small, the noise also small, and accordingly the offset value is taken small to broaden the dynamic range for the signal.

Incidentally, in the above both embodiments explanations were made for the case that the CCD imager has the mosaic-type color filter with primary and complementary colors. However, this invention is also applicable to a case of processing an output signal from a CCD with a stripe-type color filter.

Figure 23:
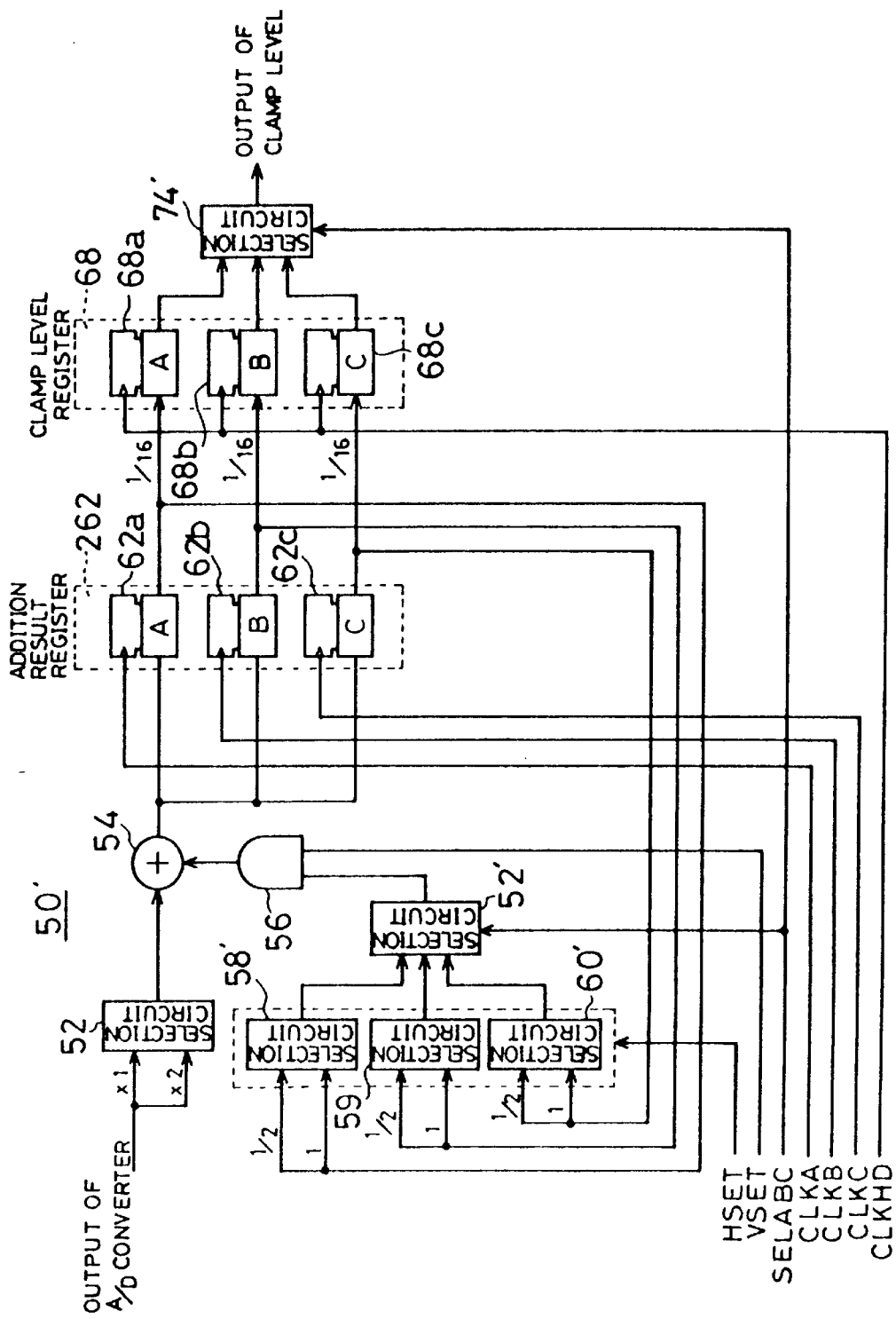
FIG. 23 is a block diagram showing in detail the clamp-level calculating circuit in a case of using CCD imager with a stripe-type color filter in the embodiment of FIG. 12.

That is, a clamp level calculating circuit shown in FIG. 23 includes, similarly to the clamp level calculating circuit 50, a selecting circuit 52, an adding circuit 54, an AND gate 56, an adding register 262, a selecting circuits 58', 59 and 60, a selecting circuit 52', a clamp value register 68, and a selecting circuit 74'. The selecting circuits 52' and 74' are controlled by a signal (color-separation pulse) SELAB that becomes to a high level on every pixel of a stripe-type color filter (not shown). If the signal SELAB is in the high level for a first pixel, the selecting circuits 52' and 74' select an upper side input. If the signal SELAB is in the high level at timing of a second pixel, the selecting circuits 52' and 74' select a middle input. And, when the signal SELAB is in the high level at timing of a third pixel, the selecting circuits 52' and 74' select a lower side input. Other operations than the above can be easily understood from FIG. 11 mentioned before, and repetitive detailed explanations will be omitted here. In any case, the circuit of FIG. 16 calculates clamp levels every three pixel on each pixel.

Figure 24:
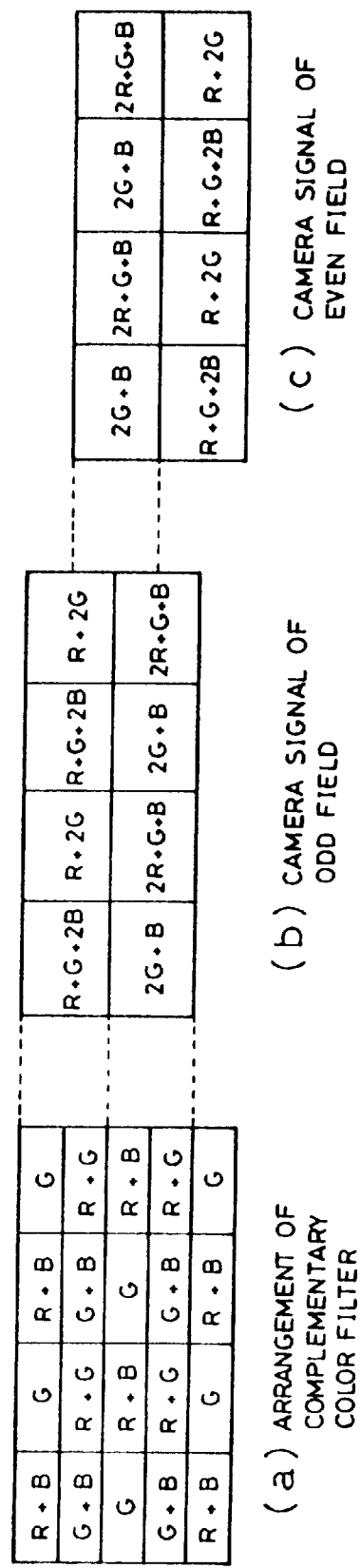
FIG. 24 is an explanatory diagram showing an arrangement of a mosaic-type color filter.

The invention is also applicable to the case of processing output signals from a CCD with a complementary-color mosaic color filter shown in FIG. 24(*a*). In this case, electric charges for vertical two pixels are mixed in an odd field as shown in FIG. 24(*b*) or in an even field as shown in FIG. 24(*c*), so that the number of vertical pixels of a solid-state imaging unit 12 is "480". However the number of lines to be actually outputted from the solid-state imaging unit in each field is "240". Here, the technique of creating video signals from the image signals as shown in FIG. 24(*c*) and FIG. 24(*d*) is disclosed in detail by Japanese Provisional Patent Publication (Kokai) No. H6-46431.

In addition, in the above described embodiments, the present invention is applied to the digital video camera having the quadruple-speed photographing mode; however, the inventive concept for setting the analog clamp area and the digital clamp area can be also applied to a digital still camera having nothing to do with the high-speed photographing mode.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera, comprising:

an image sensor which outputs line signals;

an analog clamper which clamps each of said line signals in an analog clamp area of said image sensor;

a converter which converts each of analog-clamped line signals into digital signal; and a digital clamper which clamps said digital signal in a digital clamp area, wherein said analog clamp area is set such that both horizontal ends of said analog clamp area are positioned at the outside of said digital clamp area.

2. A digital camera as recited in claim 1, wherein said analog clamp area covers said digital clamp area at least with respect to a horizontal direction.

3. A digital camera as recited in claim 1, wherein said analog clamp area is set at a different area from said digital clamp area.

4. A digital camera as recited in claim 1, further comprising a first mode setter which sets a first photographing mode utilizing a whole area of said image sensor, wherein said analog clamp area and said digital clamp area are set, in said first photographing mode, at rear edges of said line signals.

5. A digital camera as recited in claim 1, further comprising a second mode setter which sets a second photographing mode utilizing part of a whole area of said image sensor including one vertical end and one horizontal end thereof, wherein said analog clamp area and said digital clamp area are respectively set, in said second photographing mode, at said one vertical end and said one horizontal end.

\* \* \* \* \*